(12) United States Patent
Weinstock et al.

(10) Patent No.: US 12,478,217 B2
(45) Date of Patent: Nov. 25, 2025

(54) EXTRUSION ASSEMBLY FOR A MICRO-PUREE MACHINE

(71) Applicant: SharkNinja Operating LLC, Needham, MA (US)

(72) Inventors: Noah William Weinstock, Boston, MA (US); Pierce James Barnard, Manly (AU); Ming Li Shi, Guangdong (CN); Kaiping Hu, Guangdong (CN); Xu Sheng Deng, Guangdong (CN)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/595,116

(22) Filed: Mar. 4, 2024

(65) Prior Publication Data

US 2024/0292861 A1 Sep. 5, 2024

Related U.S. Application Data

(60) Provisional application No. 63/578,733, filed on Aug. 25, 2023, provisional application No. 63/488,295, filed on Mar. 3, 2023.

(51) Int. Cl.

| | |
|---|---|
| *A47J 43/07* | (2006.01) |
| *A23G 9/22* | (2006.01) |
| *A23G 9/28* | (2006.01) |
| *B01F 27/112* | (2022.01) |
| *B01F 27/806* | (2022.01) |
| *B01F 35/75* | (2022.01) |
| *B01F 101/13* | (2022.01) |

(52) U.S. Cl.

CPC .......... *A47J 43/0727* (2013.01); *A23G 9/224* (2013.01); *A23G 9/281* (2013.01); *B01F 27/112* (2022.01); *B01F 27/806* (2022.01); *B01F 35/754251* (2022.01); *B01F 2101/13* (2022.01)

(58) Field of Classification Search
CPC . A23P 30/20; A47J 43/0727; B01F 35/75425; B01F 2101/13
See application file for complete search history.

(56) References Cited

U.S. PATENT DOCUMENTS

| | | | |
|---|---|---|---|
| 2,626,133 A | 1/1953 | Reed | |
| 2,719,494 A | 10/1955 | Spiess, Jr. et al. | |
| 2,889,949 A | 6/1959 | Morris | |
| 3,001,770 A | 9/1961 | Mueller | |
| 4,277,184 A * | 7/1981 | Solomon | ............ A61B 17/8825 |
| | | | 366/139 |

(Continued)

FOREIGN PATENT DOCUMENTS

| | | |
|---|---|---|
| CN | 102160593 A | 8/2011 |
| CN | 107125424 A | 9/2017 |

(Continued)

*Primary Examiner* — Duane Smith
*Assistant Examiner* — Patrick M McCarty
(74) *Attorney, Agent, or Firm* — The Webb Law Firm

(57) ABSTRACT

An extrusion assembly for a micro-puree machine uses a plunger coupled to the main driven shaft to push the processed ingredients out of a nozzle coupled to the bowl. The plunger includes a seal around its perimeter to ensure maximum contact with the walls of the bowl and thus allow for maximum extrusion yield. The extrude function is integrated into a program on the main user interface with a predetermined translation speed/flow rate.

15 Claims, 38 Drawing Sheets

(56) References Cited

U.S. PATENT DOCUMENTS

| | | | |
|---|---|---|---|
| 4,420,948 A | 12/1983 | Savage | |
| 4,668,561 A | 5/1987 | Ney | |
| 4,693,611 A | 9/1987 | Verkler | |
| 4,707,997 A | 11/1987 | Bigler et al. | |
| 4,828,398 A | 5/1989 | Verkler | |
| 4,861,255 A | 8/1989 | Ney | |
| 4,974,965 A | 12/1990 | Heinhold et al. | |
| 5,071,040 A * | 12/1991 | Laptewicz, Jr. | B01F 33/5011 604/218 |
| 5,159,818 A * | 11/1992 | Etou | F25B 5/04 222/138 |
| 5,208,050 A | 5/1993 | Ney | |
| 5,400,614 A | 3/1995 | Feola | |
| 5,463,878 A | 11/1995 | Parekh et al. | |
| 5,893,485 A | 4/1999 | McGill | |
| 5,918,767 A | 7/1999 | McGill | |
| 6,068,160 A | 5/2000 | Fancher | |
| 6,119,905 A | 9/2000 | Cocchi et al. | |
| 6,254,019 B1 * | 7/2001 | Galbreath | A47J 43/085 241/199.12 |
| 6,435,377 B1 | 8/2002 | Iwata et al. | |
| 6,553,779 B1 | 4/2003 | Boyer et al. | |
| 6,817,749 B2 | 11/2004 | Saunders et al. | |
| 7,017,783 B1 | 3/2006 | Hunter et al. | |
| 7,249,879 B2 * | 7/2007 | Nabilsi | A47J 43/046 366/205 |
| 7,278,555 B2 | 10/2007 | McGill | |
| 7,861,890 B2 | 1/2011 | McGill | |
| 8,196,782 B2 | 6/2012 | De Blasi | |
| 8,297,182 B2 | 10/2012 | Cocchi et al. | |
| 8,561,839 B2 | 10/2013 | Cocchi et al. | |
| 8,616,250 B2 | 12/2013 | Herbert | |
| 8,887,522 B2 | 11/2014 | Grampassi | |
| 9,560,865 B2 | 2/2017 | Cocchi et al. | |
| 10,694,764 B2 | 6/2020 | Zappoli et al. | |
| 11,064,715 B2 | 7/2021 | Herbert et al. | |
| 11,102,992 B2 | 8/2021 | Douer | |
| 11,134,703 B2 | 10/2021 | Cocchi et al. | |
| 11,185,091 B2 | 11/2021 | Koehl et al. | |
| 11,259,542 B2 | 3/2022 | Jacob et al. | |
| 11,486,631 B2 | 11/2022 | Fonte et al. | |
| 11,528,922 B2 | 12/2022 | Beth Halachmi | |
| 11,622,568 B2 | 4/2023 | Kaliszewski et al. | |
| 11,627,747 B2 | 4/2023 | Fonte et al. | |
| 2004/0161503 A1 | 8/2004 | Malone et al. | |
| 2005/0105385 A1 * | 5/2005 | McGill | B01F 35/713 366/139 |
| 2005/0173462 A1 | 8/2005 | Stumler et al. | |
| 2005/0183426 A1 | 8/2005 | Learned | |
| 2006/0169727 A1 | 8/2006 | Cocchi et al. | |
| 2007/0110872 A1 | 5/2007 | Gerber | |
| 2007/0199614 A1 | 8/2007 | Cocchi et al. | |
| 2008/0173183 A1 * | 7/2008 | Chen | A47J 31/02 99/285 |
| 2010/0116846 A1 | 5/2010 | Cortese et al. | |
| 2010/0147875 A1 | 6/2010 | Santos et al. | |
| 2012/0205395 A1 | 8/2012 | McGill | |
| 2013/0064034 A1 * | 3/2013 | Almblad | A23G 9/28 366/205 |
| 2014/0178545 A1 * | 6/2014 | Fach | A47J 43/0716 366/205 |
| 2016/0255859 A1 | 9/2016 | Salerno | |
| 2016/0345605 A1 | 12/2016 | McGill et al. | |
| 2019/0008181 A1 | 1/2019 | Scott et al. | |
| 2019/0053515 A1 | 2/2019 | Stojkovski et al. | |
| 2019/0357721 A1 * | 11/2019 | Herndon | A47J 31/18 |
| 2020/0260756 A1 | 8/2020 | Crundwell et al. | |
| 2021/0068419 A1 | 3/2021 | Spirk et al. | |
| 2021/0120841 A1 | 4/2021 | Kiser et al. | |
| 2021/0331129 A1 * | 10/2021 | Guo | B01F 35/75425 |
| 2022/0110339 A1 | 4/2022 | Beth Halachmi et al. | |
| 2022/0159992 A1 | 5/2022 | Hugenroth et al. | |
| 2023/0292785 A1 | 9/2023 | Collins et al. | |
| 2024/0008687 A1 * | 1/2024 | Mastroianni | A47J 43/044 |

FOREIGN PATENT DOCUMENTS

| | | | |
|---|---|---|---|
| DE | 3003947 A * | 8/1980 | A23G 9/12 |
| EP | 0995685 B1 | 4/2003 | |
| EP | 1123010 B1 | 4/2003 | |
| EP | 1186240 B1 | 8/2005 | |
| EP | 1763478 A2 | 3/2007 | |
| EP | 2151168 B1 | 4/2015 | |
| EP | 2708141 B1 | 4/2018 | |
| EP | 3616528 A1 | 3/2020 | |
| EP | 3305090 B1 | 4/2020 | |
| EP | 3292768 B1 | 3/2021 | |
| ES | 1071424 U | 2/2010 | |
| GB | 2342957 A | 4/2000 | |
| GB | 2344139 A | 5/2000 | |
| GB | 2414225 A | 11/2005 | |
| WO | 2004103831 A3 | 12/2004 | |
| WO | 2005113387 A2 | 12/2005 | |
| WO | 2007121967 A3 | 2/2008 | |
| WO | WO-2014075014 A1 * | 5/2014 | A23G 9/22 |
| WO | 2014098547 A1 | 6/2014 | |
| WO | 2015011691 A1 | 1/2015 | |
| WO | 2022020653 A1 | 1/2022 | |
| WO | 2022108696 A1 | 5/2022 | |

* cited by examiner

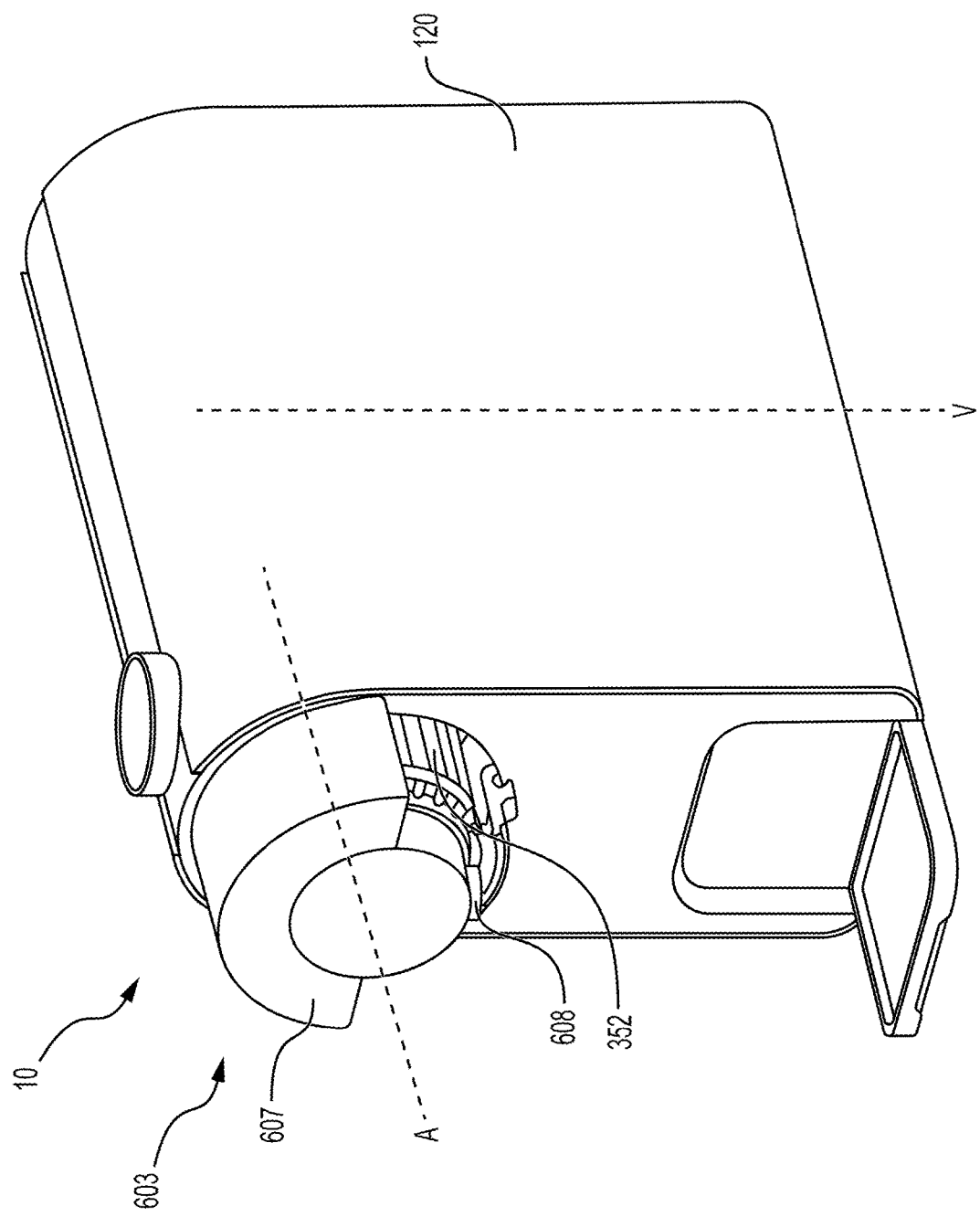

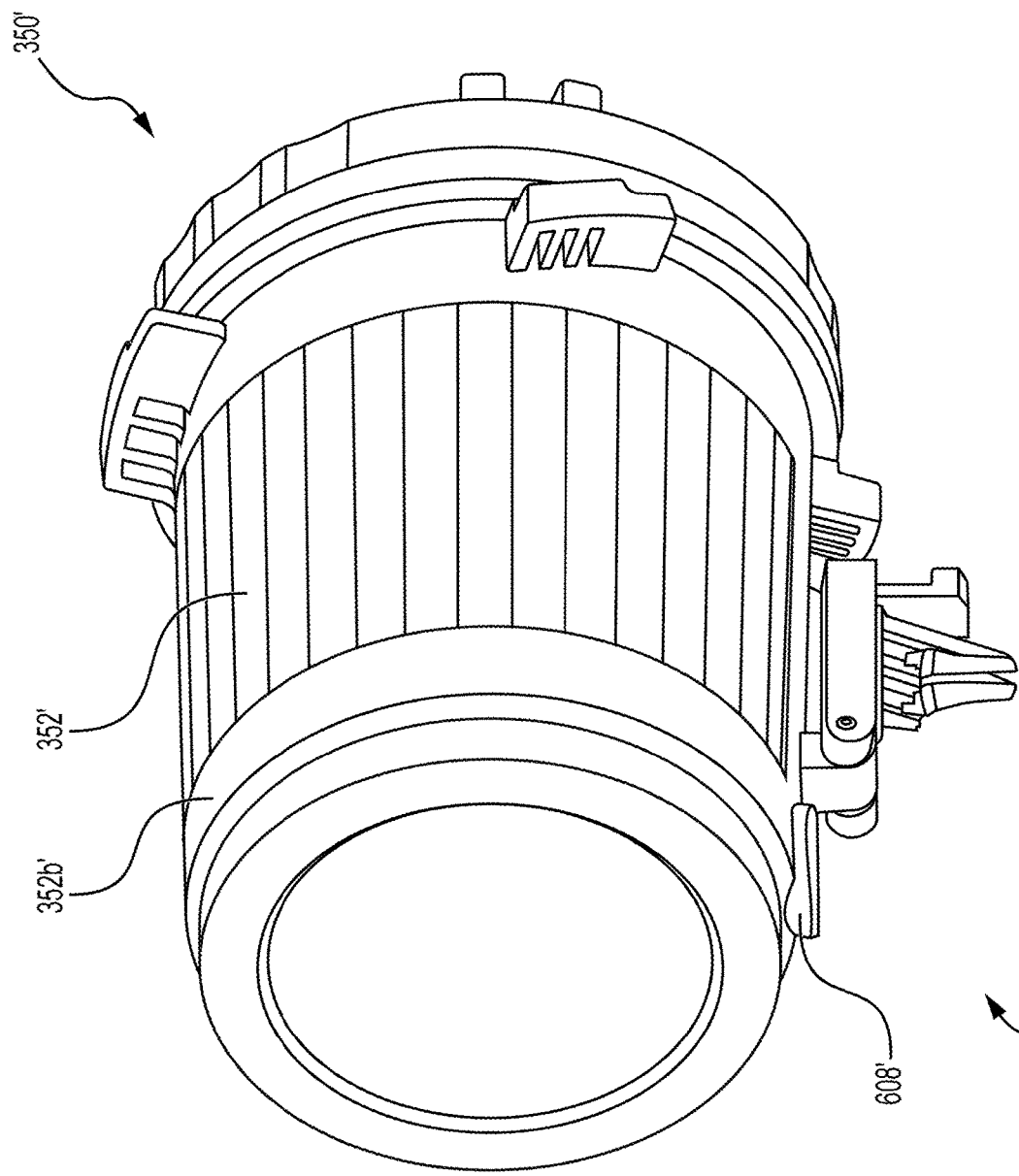

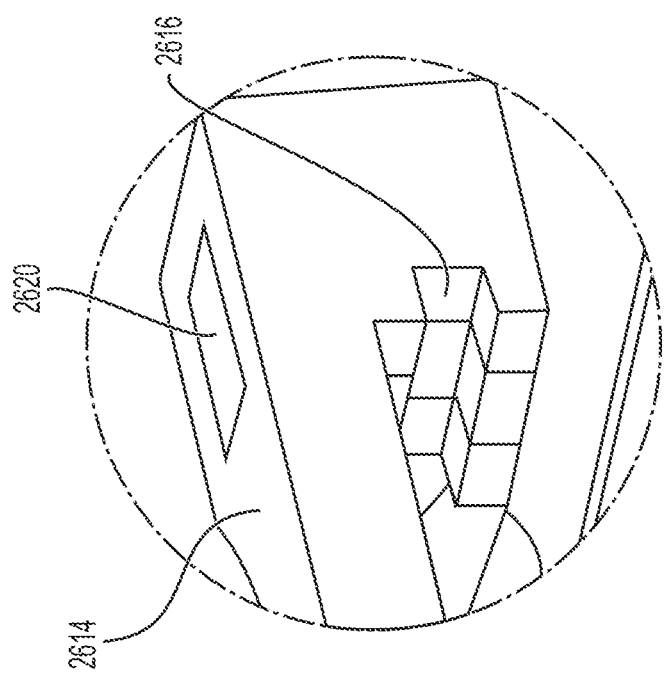
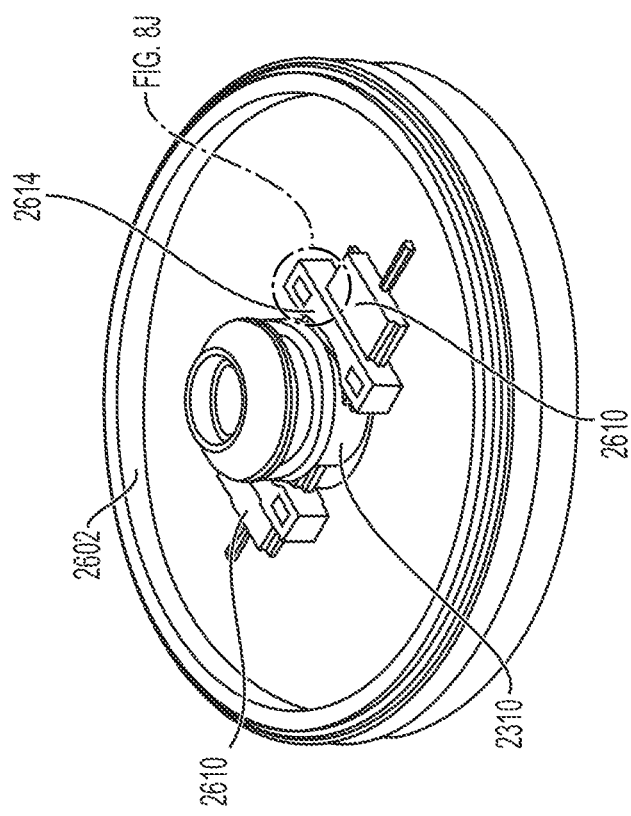
*FIG. 8J*
*FIG. 8I*

EXTRUSION ASSEMBLY FOR A MICRO-PUREE MACHINE

CROSS-REFERENCE TO RELATED APPLICATIONS

This application claims priority to and benefit of U.S. Provisional Application No. 63/488,295, filed on Mar. 3, 2023, entitled EXTRUSION ASSEMBLY FOR A MICRO PUREE MACHINE, and U.S. Provisional Application No. 63/578,733, filed on Aug. 25, 2023, entitled EXTRUSION ASSEMBLY FOR A MICRO PUREE MACHINE, the entire contents of which are incorporated by reference herein for all purposes.

FIELD

The present disclosure relates to a food processing device and, more particularly, to a micro-puree machine that allows for processing, aeration, and extrusion of ingredients.

BACKGROUND

Domestic kitchen appliances that are intended to make ice creams, gelatos, frozen yogurts, sorbets, and the like are known in the art. Typically, a user adds a series of non-frozen ingredients to a mixing bowl, which often has been previously cooled, for example, in a freezer. The ingredients are then churned by a one or more paddles (sometimes referred to as dashers) while a refrigeration mechanism simultaneously freezes the ingredients. These devices have known shortcomings including, but not limited to, the amount of time and effort required by the user to complete the ice cream-making process. Machines of this nature are impractical for preparing most non-dessert food products.

An alternative type of machine known for making a frozen food product is what is referred to herein as a micro-puree machine. Typically, machines of this nature spin and plunge a blade into a pre-frozen ingredient or combination of ingredients. While able to make frozen desserts like ice creams, gelatos, frozen yogurts, sorbets and the like, micro-puree style machines can also prepare non-dessert types of foods such as non-dessert purees and mousses.

SUMMARY

In some embodiments, the disclosure describes an extrusion assembly for a micro-puree machine for pushing processed ingredients out of a nozzle coupled to the processing bowl. The extrude function may be integrated into a program on the main user interface with a predetermined translation speed/flow rate.

In some embodiments, the disclosure also describes a bowl assembly for a micro-puree machine that includes a processing bowl. In one embodiment, the position of the bowl may be reversible in between the processing and extruding steps without the need to remove and replace a lid or expose the ingredients to the environment during the operation. In another embodiment, the processing lid and the extrusion lid may both be used to cap the same open end of the processing bowl while the other end of the bowl includes the extrusion nozzle.

In embodiments, the micro-puree machine of this disclosure includes a housing and a bowl assemblable to the housing. The bowl includes a sidewall defining an interior volume. The sidewall extends between a first end of the bowl and second end opposite the first end. A first lid removably couples to the first end of the bowl. The first lid is configured to house a blade that processes ingredients to produce processed ingredients. A nozzle is in fluid communication with the bowl. A plunger is engageable with a driven shaft of the micro-puree machine. The driven shaft is configured to axially move the plunger within the interior volume of the bowl to force the processed ingredients within the interior volume to be extruded from the nozzle.

In further embodiments, the first lid is configured to house the plunger. In embodiments, the micro-puree machine further includes a second lid removably couplable to the first end of the bowl. The plunger is couplable to the second lid prior to moving axially within the interior volume. In embodiments, the bowl has an end wall and the nozzle is configured for fluid communication with the bowl through a passage defined by an opening in the end wall. In embodiments, the driven shaft is further engageable with the blade for processing the ingredients in the bowl. In embodiments, the driven shaft is configured to axially move the blade within the interior volume of the bowl. In embodiments, the micro-puree machine further includes another shaft separate from the driven shaft. The other shaft is engageable with the blade for processing the ingredients in the bowl. In embodiments, the other shaft is configured to axially move the blade within the interior volume of the bowl. In embodiments, the bowl is engageable to the micro-puree machine between a first configuration, in which the bowl is configured for processing of ingredients within the interior volume, and a second configuration, in which the bowl is configured for extrusion of the processed ingredients from the interior volume. The bowl is reversible along its major axis between the first and second configurations. In embodiments, the micro-puree machine further includes a second lid removably couplable to the second end of the bowl. The plunger is couplable to the second lid prior to moving axially within the interior volume.

Embodiments of an extrusion assembly for extruding processed ingredients from a micro-puree machine of this disclosure include a bowl including a sidewall defining an interior volume. The sidewall extends between a first end of the bowl and second end opposite the first end. A first lid is removably couplable to the first end of the bowl. The first lid is configured to house a blade that processes ingredients to produce processed ingredients. A nozzle is in fluid communication with the bowl. A plunger is engageable with a driven shaft of the micro-puree machine. The driven shaft is configured to axially move the plunger within the interior volume of the bowl to force the processed ingredients within the interior volume to be extruded from the nozzle.

In further embodiments, the first lid is configured to house the plunger. In embodiments, the extrusion assembly further includes a second lid removably couplable to the first end of the bowl. The plunger is couplable to the second lid prior to moving axially within the interior volume. In embodiments, the bowl has an end wall and the nozzle is configured for fluid communication with the bowl through a passage defined by an opening in the end wall. In embodiments, the driven shaft is further engageable with the blade for processing the ingredients in the bowl. In embodiments, the driven shaft is configured to axially move the blade within the interior volume of the bowl. In embodiments, the bowl is engageable to the micro-puree machine between a first configuration, in which the bowl is configured for processing of ingredients within the interior volume, and a second configuration, in which the bowl is configured for extrusion of the processed ingredients from the interior volume. The bowl is reversible along its major axis between the first and second configurations. In embodiments, the extrusion assembly further includes a second lid removably couplable to the second end of the bowl. The plunger is couplable to the second lid prior to moving axially within the interior volume.

Embodiments of a method of extruding processed ingredients from a micro-puree machine of this disclosure include a micro-puree machine having an extrusion assembly. The extrusion assembly has a bowl including a sidewall defining an interior volume. The sidewall extends between a first end of the bowl and second end opposite the first end. A first lid is removably coupleable to the first end of the bowl. The first lid is configured to house a blade that processes ingredients to produce processed ingredients. A nozzle is in fluid communication with the bowl. A plunger is engageable with a driven shaft of the micro-puree machine. The driven shaft is configured to axially move the plunger within the interior volume of the bowl. The method further includes engaging a blade with the driven shaft and, using the blade, processing ingredients within the interior volume of the bowl. The method also includes disengaging the blade from the driven shaft and engaging the plunger with the driven shaft. The method also includes moving the plunger through the interior volume of the bowl to extrude the processed ingredients from the nozzle. In further embodiments, the method includes, after disengaging the blade from the driven shaft and before engaging the plunger with the micro-puree machine, removing the first lid and attaching a second lid housing the plunger to the first end of the bowl.

A reading of the following detailed description and a review of the associated drawings will make apparent the advantages of these and other structures. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein:

FIG. 1A shows an isometric view of a micro-puree machine, according to some embodiments of the disclosure.

FIGS. 1C-1G illustrate embodiments of extrusion assemblies, bowl assemblies, and/or nozzle assemblies of the micro-puree machine of FIG. 1A, according to some embodiments of the disclosure;

FIGS. 8D-8J illustrate the use of the extrusion assembly of FIGS. 8A-8C, according to some embodiments of the disclosure;

DETAILED DESCRIPTION

Figure 1B:
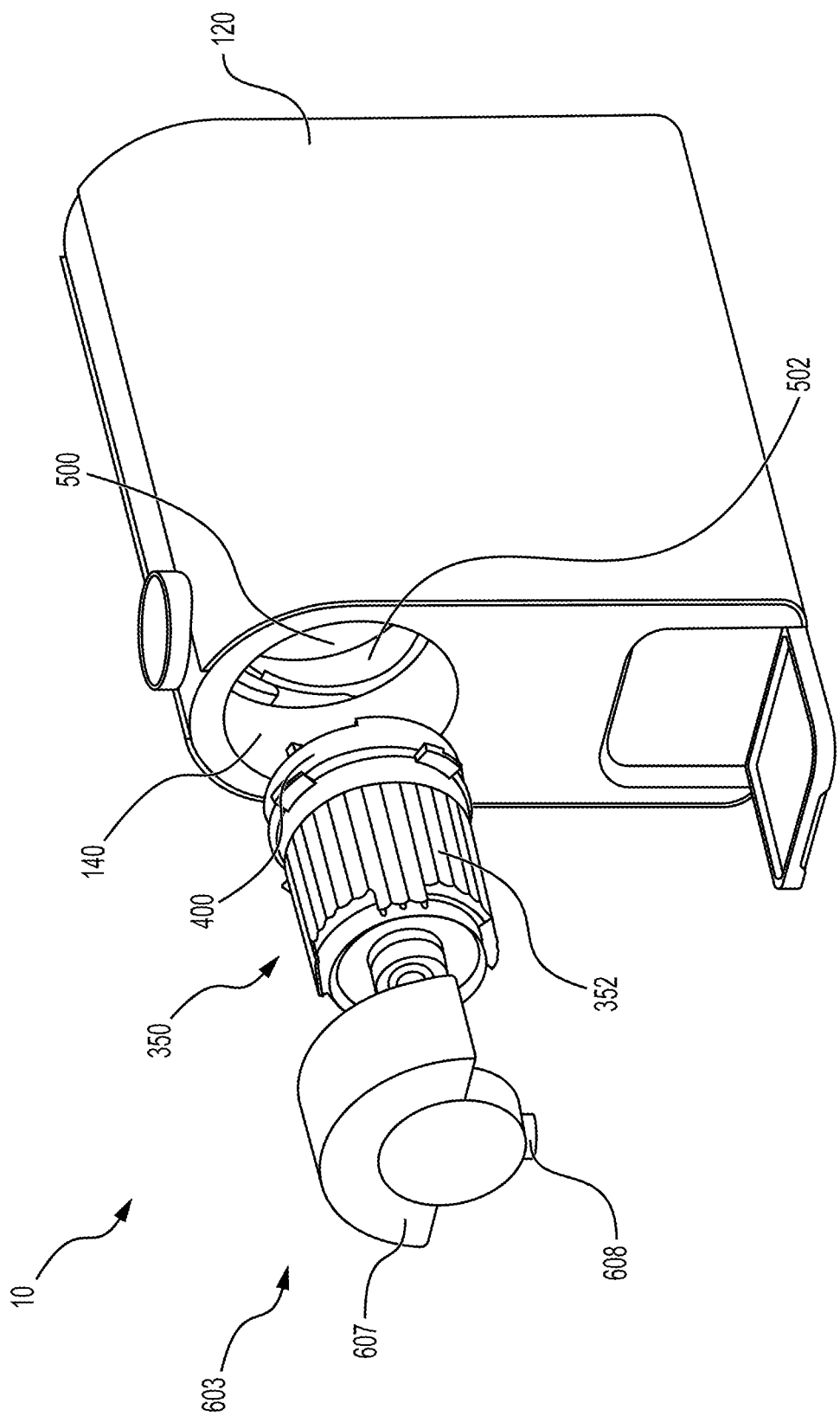
FIG. 1B shows the micro-puree machine of FIG. 1A with the bowl assembly disassembled from the housing, according to some embodiments of the disclosure.

In the following description, like components have the same reference numerals, regardless of different illustrated embodiments. To illustrate embodiments clearly and concisely, the drawings may not necessarily reflect appropriate scale and may have certain structures shown in somewhat schematic form. The disclosure may describe and/or illustrate structures in one embodiment, and in the same way or in a similar way in one or more other embodiments, and/or combined with or instead of the structures of the other embodiments.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the disclosure in any manner.

Notably, the mechanisms and techniques described herein may be used to configure a machine to process (e.g., micro-puree and perhaps aerate) and extrude ice cream and other frozen ingredients. That is, both the processing and extrusion functions can be performed by a single machine. In such a machine, a same shaft may be used to drive a blade to process the frozen ingredients in a bowl (i.e., a container) and to drive a plunger to extrude the processed ingredients from the bowl. Further, such a machine may include a user interface enabling a user to control the timing of the performance of each function. In some implementations of such a machine, a first shaft may be used to drive processing and a second shaft may be used to drive extrusion, and such implementations may be considered to have a first subsystem or module for processing and a second sub-system or module for extrusion.

In some embodiments, a single lid may be provided (e.g., on an open end of the bowl) that houses (or is coupled to) a blade for processing ingredients, and that also houses (or is coupled to) a plunger for extruding the processed ingredients. In such embodiments, a single shaft driven by one or more motors (e.g., one motor for driving rotation of blade; the other motor for driving linear movement of the driven shaft along its axis) may drive both the processing that uses the blade and the extrusion that uses the plunger, as described in more detail elsewhere herein, and an end of the bowl opposite the lid may include an opening for extrusion of the processed ingredients from the bowl.

In other embodiments, to enable the performance of both functions, the user may flip the processing bowl from a first arrangement, in which the driven shaft engages a blade at a first end of the processing bowl (e.g., the blade housed in or coupled to a first lid at a first open end of the processing bowl), to a second arrangement, in which the driven shaft engages a plunger at a second end of the processing bowl (e.g., the plunger housed in or coupled to a second lid at an open second end of the processing bowl), as described in more detail herein. In such embodiments, the first lid also may include an opening for extruding the ingredients from the bowl during extrusion using the plunger in the second arrangement. Further, in such embodiments, a single shaft driven by one or more motors may drive both the processing by use of the blade and the extrusion by use of the plunger, as described in more detail elsewhere herein.

In other embodiments, to enable the performance of both functions, the user may replace a first lid (e.g., housing or coupled to a blade) for processing from an open end of the processing bowl with a second lid (e.g., housing or coupled to a plunger) for extruding, as described in more detail elsewhere herein. In such embodiments, a single shaft driven by one or more motors may drive both the processing by use of the blade and the extrusion by use of the plunger, or alternatively, a separate shaft may be used for extruding, in which such separate shaft drives the plunger, as described in more detail elsewhere herein.

FIG. 1A shows an isometric view of a micro-puree machine 10, according to some embodiments of the disclosure. FIG. 1B shows the micro-puree machine 10 of FIG. 1A with the bowl assembly 350 disassembled from the housing 120 according to some embodiments of the disclosure. FIGS. 1C-1G illustrate embodiments of the extrusion assemblies, bowl assemblies, and/or nozzle assemblies, according to some embodiments of the disclosure.

The micro-puree machine 10 may include a housing 120, which may include a user interface (not shown) for receiving user inputs to control the micro-puree machine 10 and/or display information. The micro-puree machine 10 also may include a bowl assembly 350 and a nozzle assembly 603. The combination of a bowl assembly 350, which may include a lid 400 configured for extruding, and a nozzle assembly 603 may be referred to herein as an extrusion assembly. The nozzle assembly 603 may include a nozzle housing 607 and a nozzle 608.

The bowl assembly 350 may include a bowl 352 configured to contain one or more processed ingredients, ingredients to be processed, or ingredients being processed. A user may couple the bowl assembly 350 to the housing 120 by rotating the bowl assembly 350 relative to the housing 120 (e.g., using screwing threads or a bayonet connection), or by another coupling mechanism and/or technique. The bowl assembly 350 may be assembled to the housing 120 such that a central axis A of the bowl assembly 350 extends perpendicular to a vertical axis V of the housing 120, as shown. However, the disclosure contemplates that the bowl assembly 350 may be assembled to the housing 120 such that the central axis A extends at an angle between 0 and 90° to the vertical axis, for example, as described in U.S. Pat. No. 11,759,057 to SharkNinja Operating, LLC, the entire contents of which are hereby incorporated by reference (the '057 patent), or such that the central axis of the bowl assembly 350 extends parallel to the vertical axis V, for example, as described in U.S. Pat. No. 11,871,765 to SharkNinja Operating, LLC, the entire contents of which are hereby incorporated by reference (the '756 patent). In embodiments, the bowl 352 of the bowl assembly 350 can be manufactured from a disposable material to enhance the convenience of using the micro-puree machine 10. Further, the bowl 352 can be sold as a stand-alone item and can also be prefilled with ingredients to be processed during use of the micro-puree machine 10.

As shown in FIG. 1B, the housing 120 may including a coupling 500 disposed within an opening 140 of the housing 120. An inner surface 502 of the coupling 500 may comprise locating and locking elements for positioning and connecting the bowl assembly 350 to the coupling 500 in two different configurations, as described elsewhere herein. The micro-puree machine 10 may further include a nozzle 608 couplable to the bowl assembly 350 for extruding processed ingredients from the bowl assembly 350. The nozzle 608 may be arranged such that the ingredients are extruded in a vertically downward direction such that a user can place an ice cream cone, cup, bowl, or other edible or non-edible receptacle underneath the nozzle to receive extruded ingredients. The disclosure also contemplates that multiple nozzle shapes may be provided to allow for user customizability. For example, multiple nozzles may be included on a rotatable dial that allows the user to select the desired nozzle shape. In further embodiments, the extrude function may be integrated into a program on the user interface with a predetermined translation speed/flow rate.

Figure 1C:
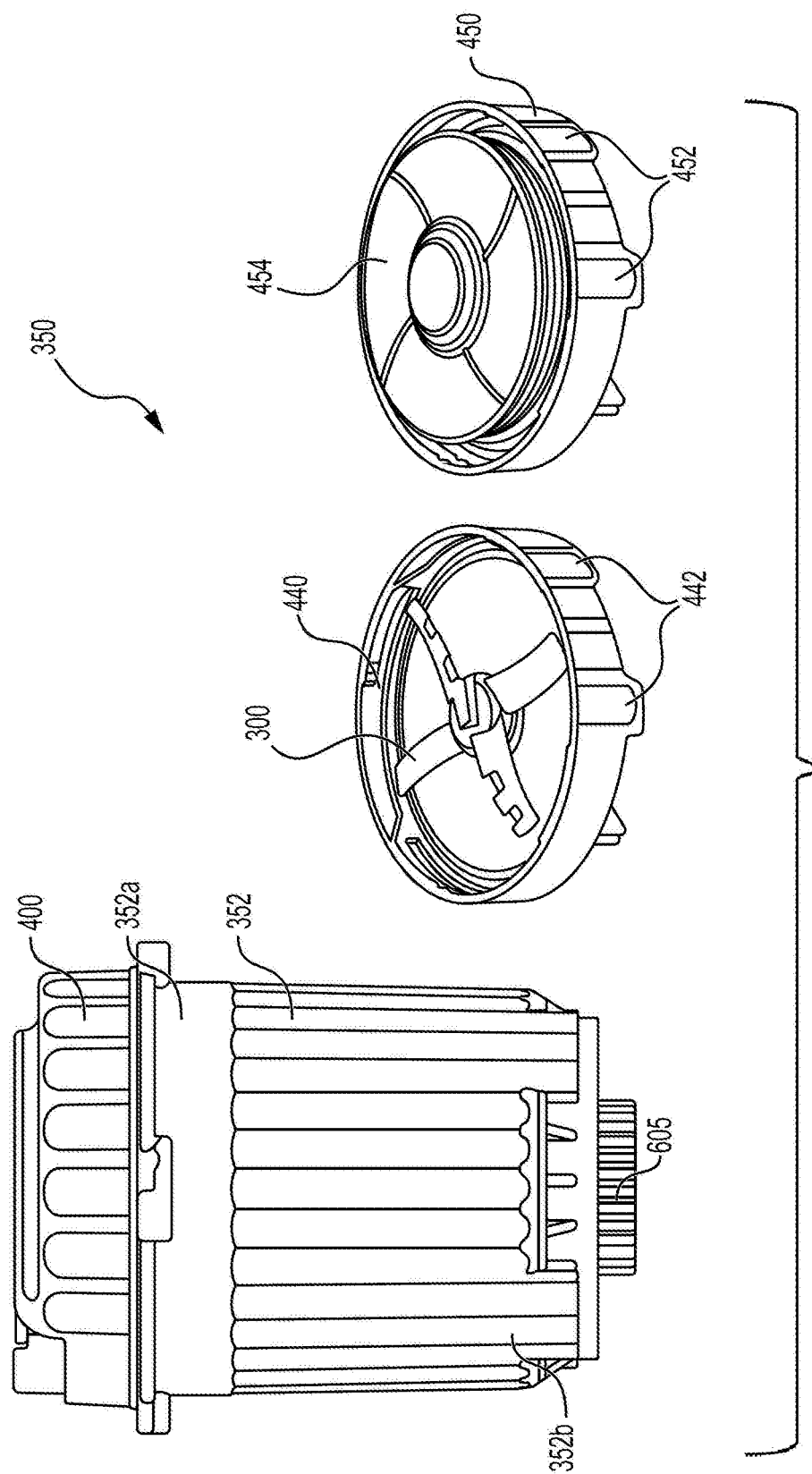

As shown in FIG. 1C, the first end 352a of the bowl 352 may be configured to couple to both a first lid 440 and the second lid 450. The first lid 440 may include a blade 300 for processing ingredients, for example, a blade as described in the '765 patent. When the lid 440 is coupled to the bowl 352 (e.g., via reciprocal threading on the bowl and lid), the bowl assembly 350 may be considered to be in a processing configuration, and may be coupled to the housing via coupling 500. The lid 440 may have locating and locking elements 442 on its exterior sidewall configured to couple to the locating and locking elements on the inner surface 502 of the coupling 500. The second lid 450 may include a plunger 454 for extruding ingredients. The plunger 454 may furthermore include a flexible seal around its perimeter to ensure contact (e.g., maximum contact) with the sidewall of the bowl 352 to allow for optimal (e.g., maximum) extrusion yield. When the lid 450 is coupled to the bowl 352 (e.g., via reciprocal threading on the bowl and lid), the bowl assembly 350 may be considered to be in an extruding configuration, and may be coupled to the housing via coupling 500. The lid 450 may have locating and locking elements 452 on its exterior sidewall configured to couple to the locating and locking elements on the inner surface 502 of the coupling 500.

The second end 352b of the bowl 352 may include a centrally located opening 604, or an opening that is not centrally located, including a coupling collar 606. The coupling collar 606 may include threading or other types of coupling features, for example, slots or cams, e.g., for bayoneting. The opening 604 may be enclosed by a cap 605, for example, during processing, which cap may be removed during extruding. The cap 605 may include interior threading (not shown) or other coupling features that allow it to couple to the coupling collar 606. The opening 604 may further be in fluid communication with a nozzle 608. For example, the opening 604 may be in fluid communication with a nozzle through a conduit (e.g., plastic tubing) that extends from the opening 604 to the nozzle 608, e.g., within nozzle assembly 603. In embodiments, such a conduit may include one or more sections connected by joints (e.g., an elbow joint) to translate the direction (e.g., horizontal) of extrusion from opening 604 to a direction (e.g., vertically downward) of extrusion from the nozzle 608.

Figure 1D:
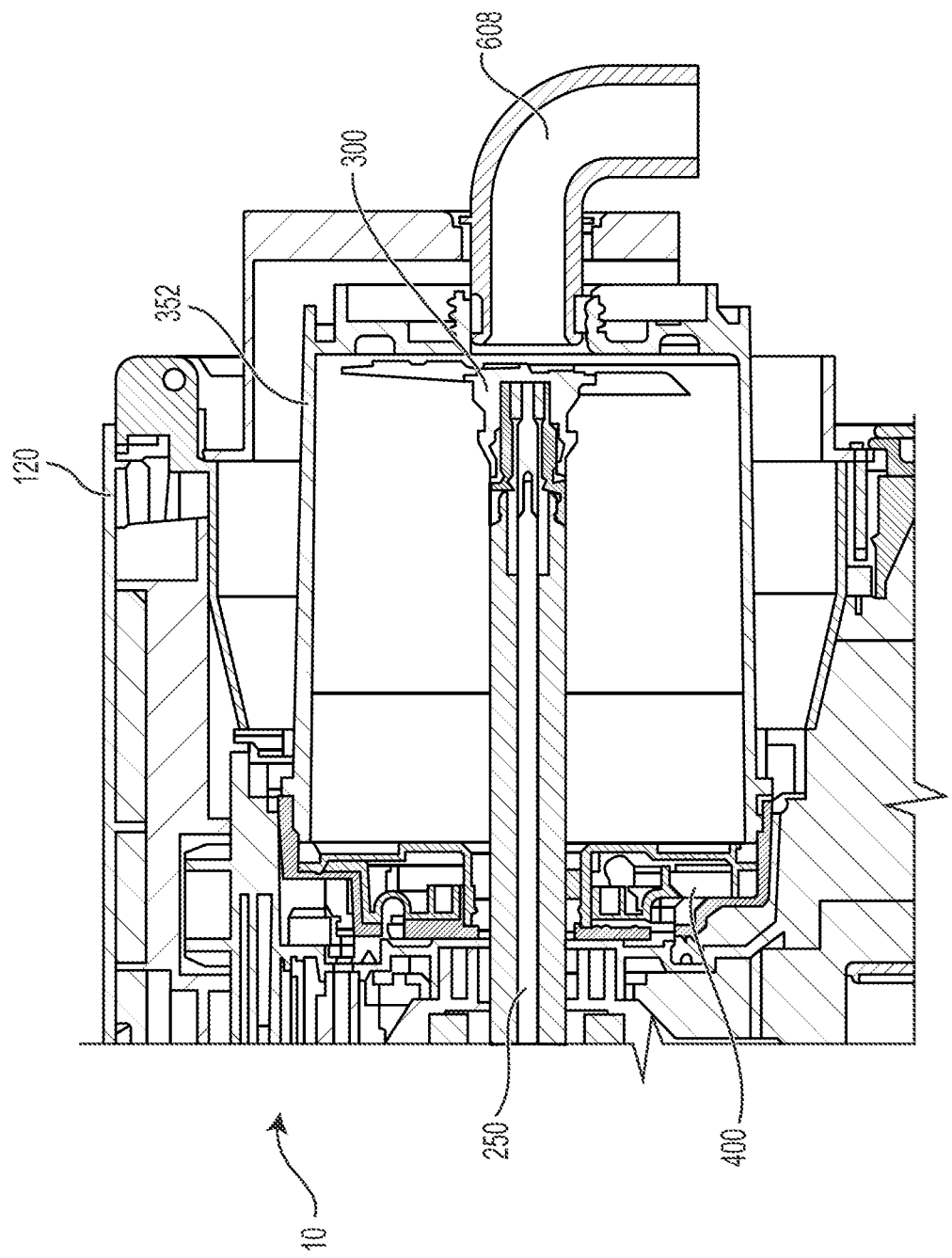
Figure 1E:
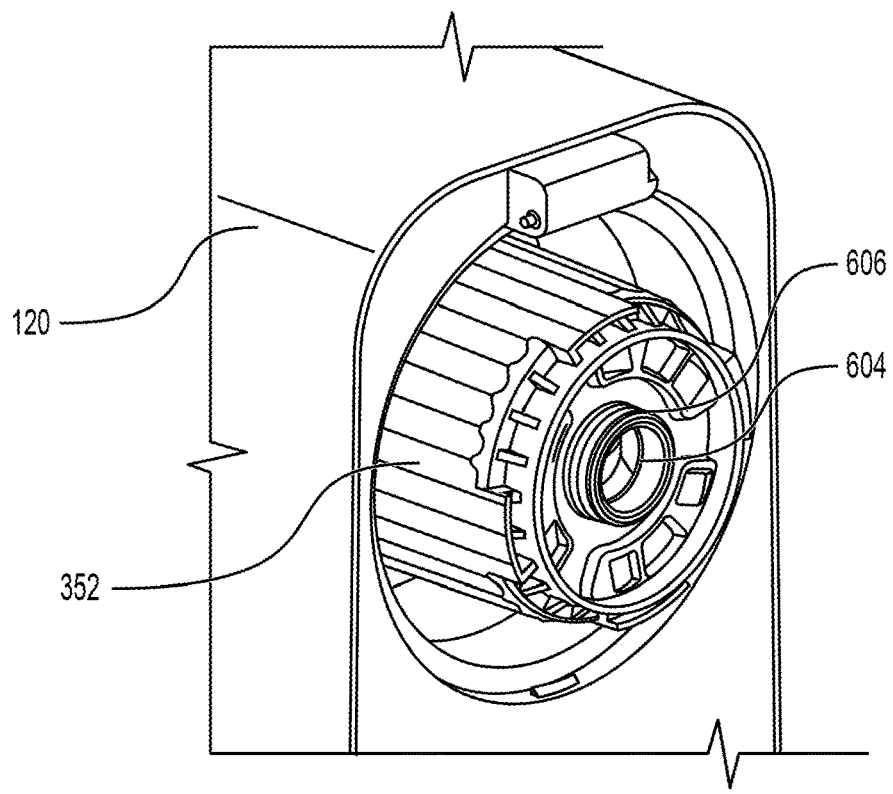

As shown in FIG. 1D, the user may attach the first lid 440 to the bowl 352 and couple the bowl assembly 350 to the micro-puree machine 10 using the coupling features described herein. The lid 440 may be configured (e.g., as described in the '765 patent) such that, when the lid 440 is coupling to the housing 120, the blade 300 engages a driven shaft 250 and disengages the lid 440. Through use of a user interface (e.g., as described in the '057 patent), the user may activate a program that controls the blade 300 to rotate and move (e.g., descend or move horizontally or at an angle) into the ingredients in the bowl 352 to process (e.g., micro-puree) them. It should be appreciated that in some embodiments, as shown in FIG. 1D, the nozzle assembly 603 or one or more components thereof (e.g., nozzle 608) may be coupled to the second end 352*b* of the bowl 350 (and perhaps to the housing) even when extrusion is not being performed, e.g., during processing. In such embodiments, the opening 604 may be closed, for example, using cap 605 or by other means. FIG. 1E is a bottom view of the bowl assembly 350 while coupled to the housing, in which the opening 604 is not covered. In actual use, the opening 604 may be closed, e.g., by cap 605, during processing, or open and coupled to the nozzle assembly 603 during extrusion.

After processing the ingredients in the bowl 352, the user then may remove the bowl assembly 350 from the micro-puree machine 10, remove the first lid 440 from first end 352*a*, replace it with lid 450 on the first end 352*a*, couple the nozzle assembly to the second end 352*b* of the bowl assembly 350 if not already attached, couple the bowl assembly 350 to the housing 120, and initiate extrusion via the user interface. During extrusion, the driven shaft drives the plunger 602 from the first end 352*a* of the bowl 352 to the second end 352*b* of the bowl, forcing the processed ingredients to extrude the processed ingredients through the opening 604 and through the nozzle 608.

Figure 1F:
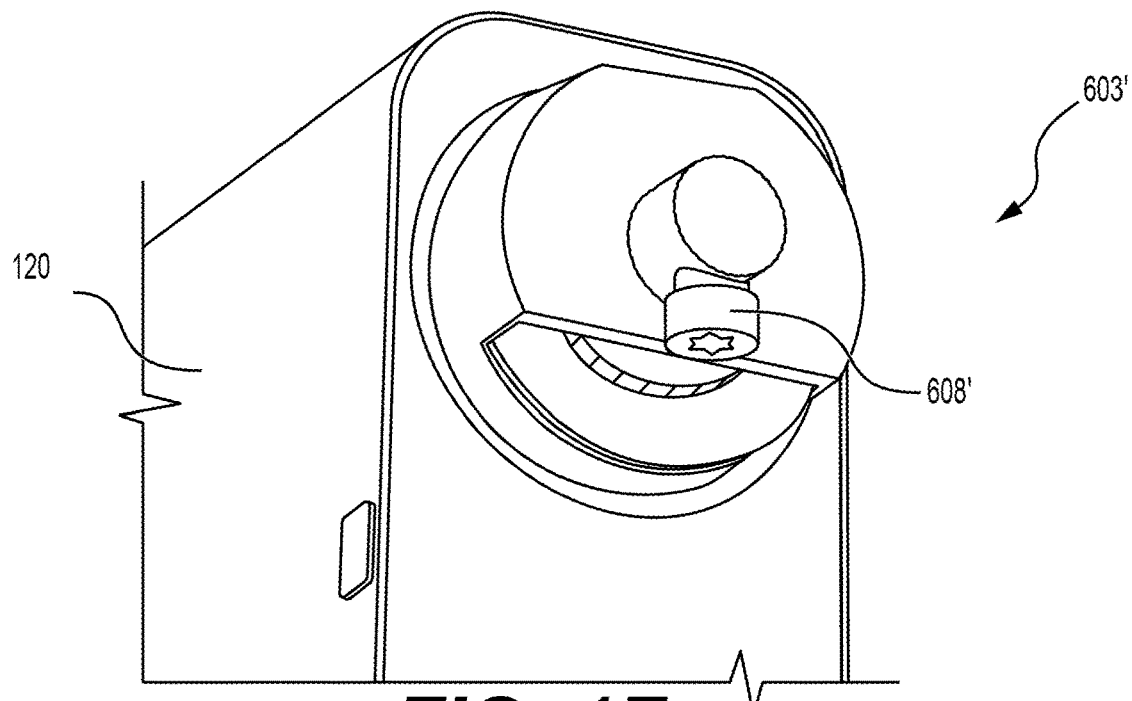

FIG. 1F illustrates another embodiment of a nozzle assembly 603', including nozzle 608', which may be used to extrude processed ingredients, for example, using mechanisms and techniques described herein.

FIG. 1G illustrates another bowl assembly 350' including the extrusion assembly 600 according to some embodiments of the disclosure. As shown in FIG. 1G, the bowl assembly 350' may include a nozzle 608' that is integrated with the bottom edge of the bowl 352', for example, on the sidewall of the bowl 352' proximate to a second end 352*b*' or extending past the second end 352*b*'. In embodiments, the bowl assembly 350' may be configured to be installed to the coupling 500 such that the nozzle 608' faces vertically downwards when the bowl 352' is properly installed. During extrusion, the movement of the plunger (e.g., plunger 454) will force the processed ingredients through the nozzle 608'.

The nozzle 608' may be selectively located on the bowl 352' to optimize the amount of processed ingredients that can be extruded, thus minimizing the amount of yield loss after extrusion. For example, the nozzle 608' may be located near the bottom edge of the bowl 352', as shown in FIG. 1G. However, the disclosure contemplates that the nozzle 608' may alternatively be located at a different longitudinal and/or radial position on the bowl 352'. Bowl assembly 350' and/or bowl 352' may be the same or different than bowl assembly 350 and/or bowl 352, respectively.

Advantageously, the micro-puree machine 10 may include a sensor (not shown) that recognizes which lid is installed into the machine 10 to restrict certain programs based on the lid functions, which may prevent user error when operating the machine 10. For example, the micro-puree machine may only activate the blade 300 when the sensor detects that the bowl 352 is installed in the first configuration in which lid 440 is coupled to bowl 350, and may only activate the plunger 602 when the sensor detects that the bowl 352 is installed in the second configuration in which lid 440 is coupled to bowl 350. For example, each of lid 440 and 450 may include distinctive physical and/or electromagnetic features, e.g., as part of locating and locking elements 442 and 452, respectively, for which coupling 500 or other elements of the micro-puree machine 10 may be configured to detect and distinguish lid 440 from lid 450.

The housing 120 may house one or more motors and a transmission system (e.g., including gearing) that drive a driven shaft (e.g., driven shaft 250) for engaging the blade 300 and/or plunger 454 when the bowl assembly 350 (coupled to lid 440 or 450, respectively) is coupled to the housing for processing or extruding, respectively, for example, as described in the '765 patent or U.S. Pat. No. 11,882,965 to SharkNinja Operating, LLC (the '965 patent), the entire contents of which are hereby incorporated by reference. For example, the one or more motors may include a first motor for driving rotation of the driven shaft 250 via the transmission, which may be used to drive the rotation of the blade 300 during processing, and, if desired (but not necessary) rotating the plunger 454 during extrusion. A second motor may be configured to move the position of the driven shaft 250, via the transmission, along its axis (e.g., back and forth; or up and down), which may be used to drive the back and forth movement of the blade 300 into and out of the bowl 350 during processing, and, if to move the plunger 454 into and out of the bowl 350 during extrusion. In embodiments, the micro-puree machine 10 may include gearboxes (e.g., high ratio gearboxes) and reinforced internals (not shown) to allow an extrusion assembly as described herein to withstand high forces and extrude thick outputs from the nozzle 608.

In some embodiments of the disclosure, a reversible bowl assembly may be used, which does not require that a lid be removed between processing and extruding. For example, the reversible bowl assembly may include: a first lid coupled at one end including a blade for processing and an opening for extruding; and a second lid at the other end including a plunger for extruding. Examples of such embodiments will now be described.

Figure 2A:
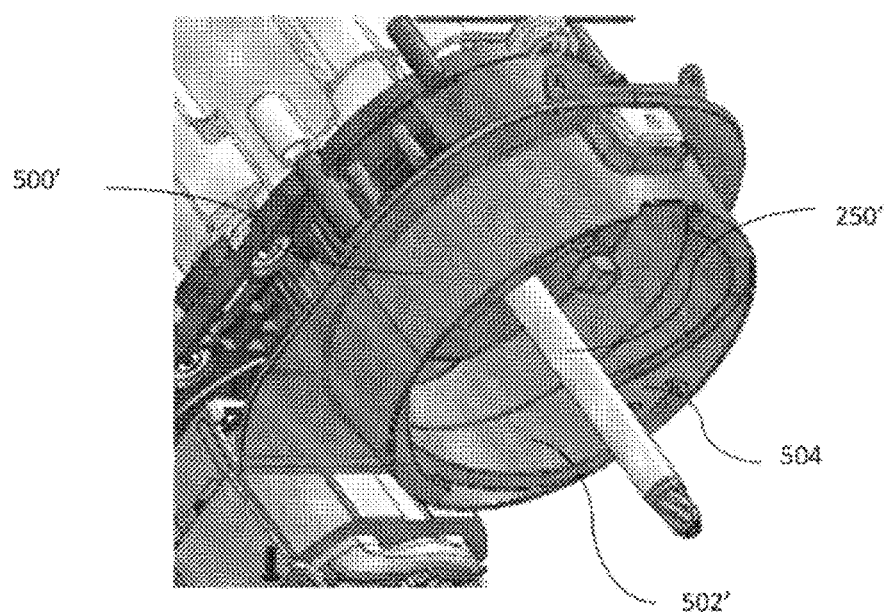
FIG. 2A illustrates a portion of another micro-puree machine, according to some embodiments of the disclosure.
Figure 2B:
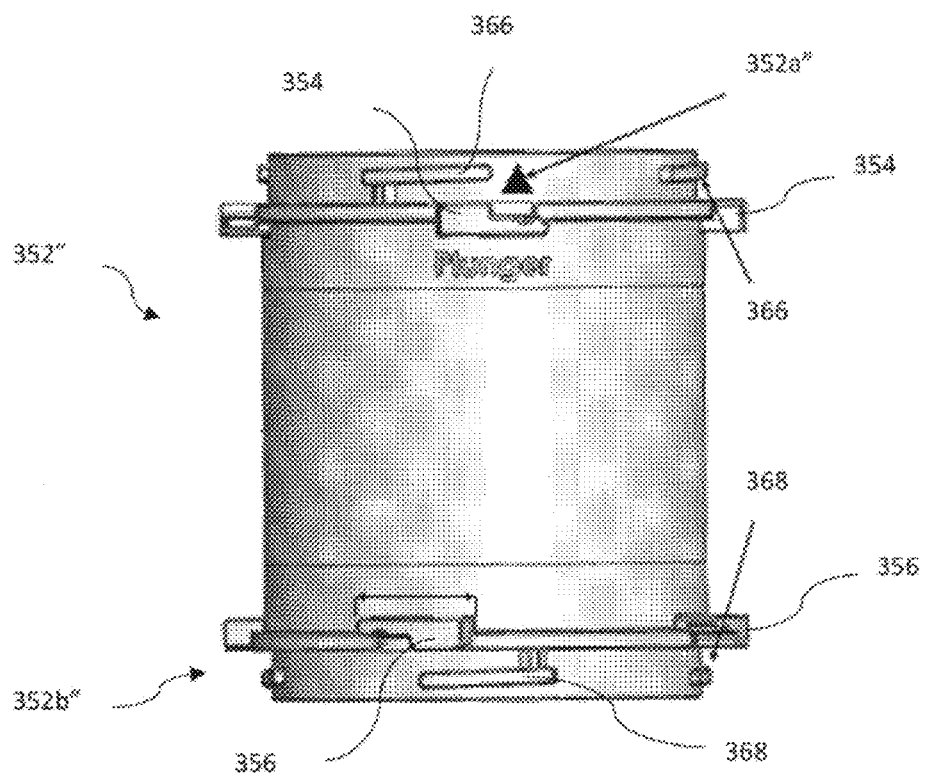
FIG. 2B illustrates a reversible bowl assembly that may be coupled to the micro-puree machine of FIG. 2A, according to some embodiments of the disclosure.

FIG. 2A illustrates an embodiment of a portion of a micro-puree machine including a coupling 500' for coupling to a bowl assembly, for example, a reversible bowl assembly, in accordance with some embodiments of the disclosure. FIG. 2B illustrates an embodiment of a reversible bowl 352" that may be coupled to coupling 500'. The bowl 352" may include any of a variety of external surfaces. For example, embodiments of the bowl may have a ribbed or corrugated surface (e.g., like bowl 352 or 352'), or a smooth surface (e.g., bowl 352"). Similarly, bowls 352 and 352" may have any variety of surfaces, including smooth surfaces.

As shown in FIG. 2A, the driven shaft 250 of the micro-puree machine 10 may extend from the housing 120 into an interior of the coupling 500' and optionally all the way through the interior of the coupling 500'. The inner surface 502' of the coupling 500' may comprise one or more slots 504 sized and shaped to receive at least one projection 354 on an outer surface of a first open end 352a" of the bowl 352". In embodiments, both the first end 352a" and the second end 352b" of the bowl 352" may be open—that is, both the first end 352a" and the second end 352b" may not have a top or bottom wall and/or a lid. However, the disclosure is not so limited, and one or both ends 352a", 352b" of the bowl 352" may be closed with a wall or a lid. In embodiments, the at least one projection 354" on the bowl 352" may be four projections 354 spaced 90 degrees apart about an outer surface of the first end 352a" of the bowl 352". However, the disclosure contemplates more or fewer than four projections 354. In a first configuration of the reversible bowl assembly 350", the user may rotate the bowl 352" relative to the coupling 500' such that the projections 354 are rotated into the slots 504, coupling (e.g., locking) the bowl 352" and the coupling 500 together.

The slots 504 also may be sized and shaped to receive at least one projection 356 on an outer surface of a second open end 352b" of the bowl 352". In embodiments, the at least one projection 356 may be four projections 356 spaced 90 degrees apart about an outer surface of the second end 352b" of the bowl 352". However, the disclosure contemplates more or fewer than four projections 356. In a second configuration of the reversible bowl assembly 350", the user may rotate the bowl 352" relative to the coupling 500' such that the projections 356 are rotated into the slots 504, coupling (e.g., locking) the bowl 352" and the coupling 500' together. The first end 352a" of the bowl 352" may further comprise threads 366 for coupling to a first lid, while the second end 352b" of the bowl 352" may comprise threads 368 for coupling to a second lid, as further described elsewhere herein.

Figure 3A:
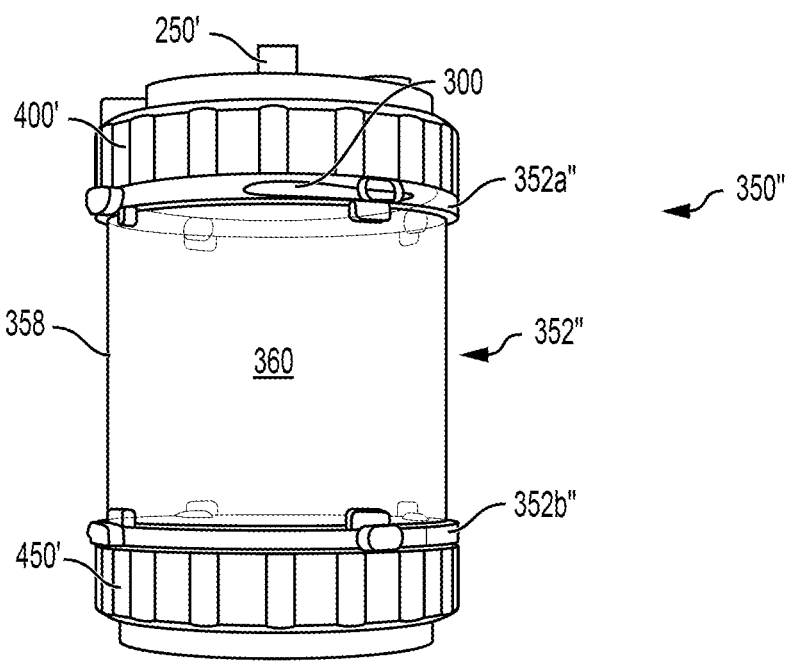
FIG. 3A shows another reversible bowl assembly, according to some embodiments of the disclosure.
Figure 3B:
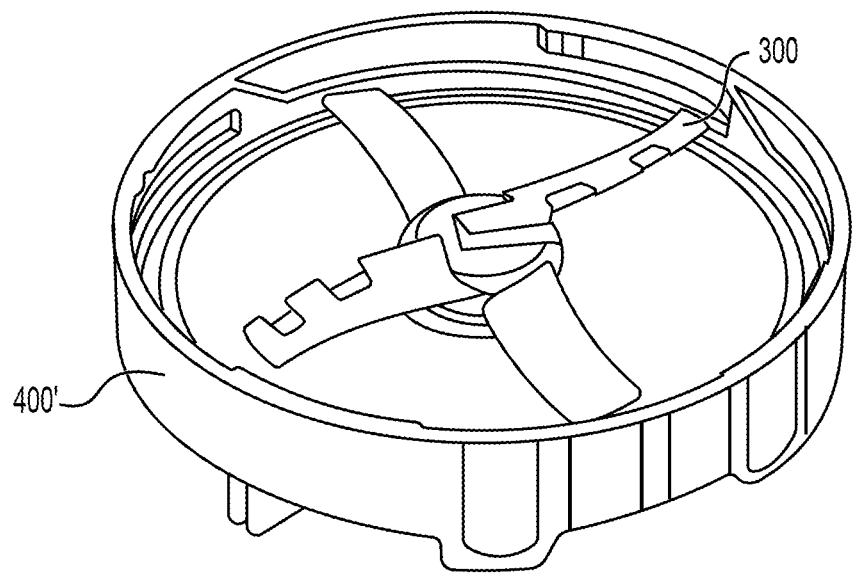
FIG. 3B shows a blade of the reversible bowl assembly of FIG. 3A, according to some embodiments of the disclosure.

FIG. 3A shows an embodiment of the reversible bowl assembly 350", assembled according to some embodiments of the disclosure. As shown in FIG. 3A, the bowl 352" may have an oblong shape and include a cylindrical sidewall 358 defining an interior volume 360 of the bowl 352". The sidewall 358 may extend between the first open end 352a" of the bowl 352" and the second open end 352b" opposite the first open end 352a". Embodiments of the sidewall 358 may have various configurations. For example, a cross-section of the sidewall may be circular or polygonal. In addition, a diameter of the sidewall may vary between the first open end 352a" and the second open end 352b" (e.g., may be tapered). The first open end 352a" and the second open end 352b" may communicate with the interior volume 360 of the bowl 352". The assembly 350" may further include a first lid 400' removably couplable to the first open end 352a" of the bowl 352". The first lid 400' may define an opening 401 (FIG. 3C) configured to couple to a blade 300 for mixing ingredients within the bowl 352". When the bowl 352" is installed to the coupling 500' in the first configuration, the blade 300 may engage with the driven shaft 250' to rotate and plunge the blade 300 within the ingredients. FIG. 3B shows an embodiment of the blade 300 coupled to the underside of first lid 400'. Some non-limiting examples of the blade 300 are shown in the '765 patent.

Figure 3C:
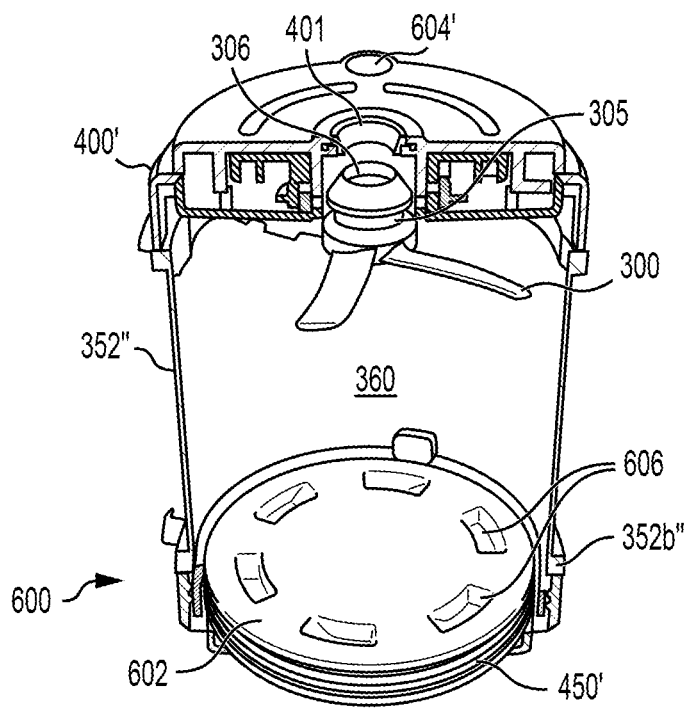
FIG. 3C is a cut-away view of the reversible bowl assembly and first lid of FIGS. 3A and 3B, according to some embodiments of the disclosure.

FIG. 3C is a cut-away view of the reversible bowl assembly 350" and the first lid 400', according to some embodiments of the disclosure, whereas blade 300 and a second lid 450' are not shown in cut-away form. As shown in FIG. 3C, the blade 300 may include a central support hub 305 including a central opening 306 for engaging the driven shaft 250. In embodiments, the second lid 450' may removably couple to the second open end 352b" of the bowl 352". The second lid 450' may include, or be coupled to, a plunger 602 for pushing the ingredients in the bowl 352" toward an opening 604 in first lid 400'. The plunger 602, alone or in combination with other components (e.g., the second lid 450', the bowl 352", or the nozzle 608), may constitute an extrusion assembly 600 for extruding processed ingredients from the bowl 352". The opening 604' in the first lid 400' may further be in fluid communication with a nozzle (e.g. nozzle 608). For example, the opening 604' may be in fluid communication with a nozzle through a conduit (e.g., plastic tubing) that extends from the opening 604' to the nozzle. In embodiments, such a conduit may include one or more sections connected by joints (e.g., an elbow joint) to translate the direction (e.g., horizontal) of extrusion from opening 604 to a direction (e.g., vertically downward) of extrusion from the nozzle.

The plunger 602 may be couplable to the driven shaft 250' of the micro-puree machine when the bowl assembly 350" is in the second configuration and the bowl 352" is installed to the coupling 500'. A surface of the plunger 602 facing the interior volume 360 may include a one or more (e.g., a plurality of) indentations 606. The indentations 606 may prevent frozen ingredients from rotational movement within the bowl 352" during processing by the blade 300. The plunger 602 may furthermore include a flexible seal 610 around its perimeter to ensure contact (e.g., maximum contact) with the sidewall 358 of the bowl 352" to allow for optimal (e.g., maximum) extrusion yield.

The micro-puree machine of the embodiments described in relation to FIGS. 2A, 2B, 3A-3D, 4B and 4B may include one or more motors and a transmission system (e.g., including gearing) that drive a driven shaft (e.g., driven shaft 250') for engaging the blade assembly 300 and/or plunger 602 when the bowl assembly 350" (coupled to lid 400' or 450', respectively) is coupled to the housing for processing or extruding, for example, as described in the '765 patent or the '965 patent; and may include gearboxes (e.g., high ratio gearboxes) and reinforced internals (not shown) to allow the extrusion assembly 600 to withstand high forces and extrude thick outputs from a nozzle.

Figure 3D:
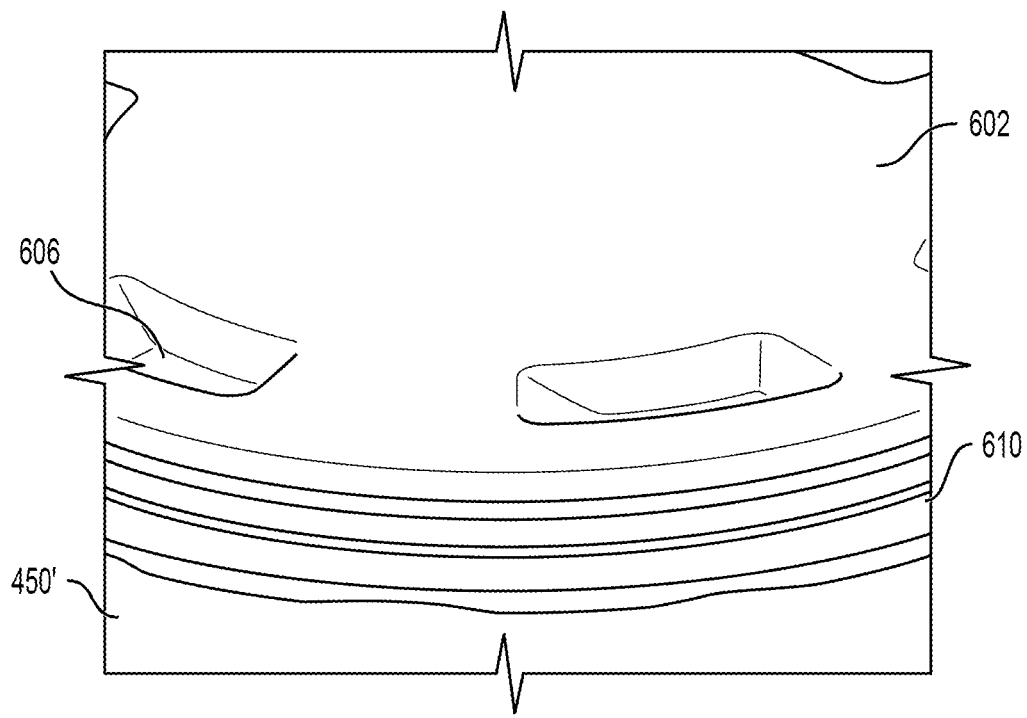
FIG. 3D shows a detailed view of an embodiment of a plunger coupled to the underside of second lid, according to some embodiments of the disclosure.

FIG. 3D shows a detailed view of an embodiment of the plunger 602 coupled to the underside of second lid 450'. In embodiments, the bowl assembly 350" may be configured such that only the first lid 400' can couple to the first open end 352a" of the bowl 352" and only the second lid 450' can couple to the second open end 352b" of the bowl 352". For example, a configuration of the threads 366 may be different from a configuration of the threads 368 (FIG. 3B) to prevent the user from attaching the wrong lid to the wrong side of the bowl 352". The bowl 352" may further include clear indicators (colors, icons, etc.) that would signal to the user which lid goes on which side of the bowl 352".

Figure 4A:
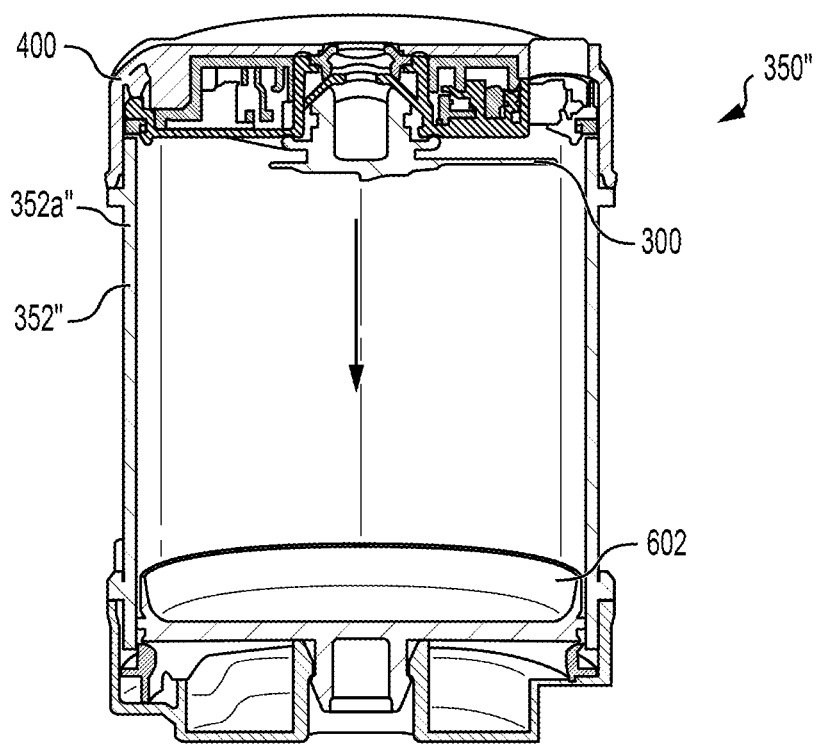
FIGS. 4A and 4B illustrate the use of the reversible bowl assembly of FIGS. 3A-3D, according to some embodiments of the disclosure.
Figure 4B:
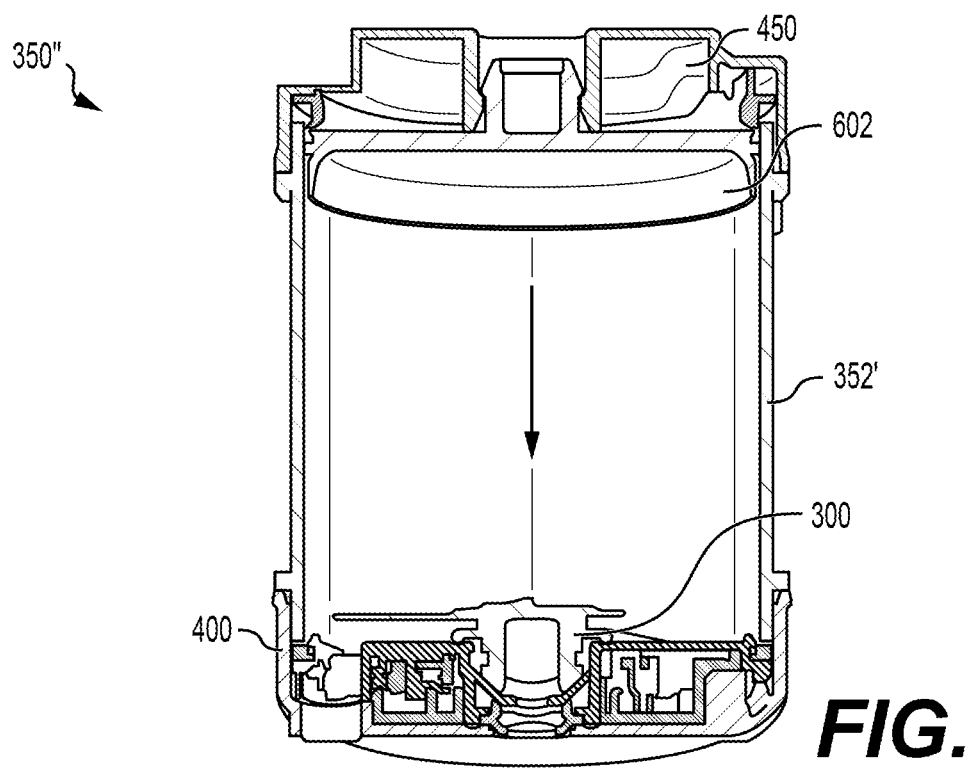

FIGS. 4A and 4B illustrate the use of the reversible bowl assembly 350" according to some embodiments of the disclosure. As shown in FIG. 4A, a user may first install the bowl assembly 350" to the micro-puree machine 10 in the first configuration such that the first end 352a" of the bowl 352" is secured to the coupling 500'. The user then may select a program at the user interface depending on the desired output (for example, soft serve ice cream, light ice cream, sorbet, gelato, etc.) to spin and plunge the blade 300 into the ingredients in the bowl 352″. For example, the blade 300 may descend into the ingredients and then ascend from the ingredients at one or more predefined rates, while rotating at one or more predefined rates. As shown in FIG. 4B, the user then may then remove the bowl assembly 350″ from the coupling 500′, reverse the orientation of the bowl assembly 350″ (i.e., flip the bowl assembly 350″) and reinstall the second end 352*b*″ of the bowl 352″ to the coupling 500′ in the second configuration. The user then may select a desired program at the user interface to descend the plunger 602 to extrude the ingredients out through the opening 604′ in the first lid 400′. For example, the plunger 602 may descend into the ingredients to extrude the ingredients out through the opening 604′ and then ascend from the opening 604′ after the extrusion is complete.

Figure 5:
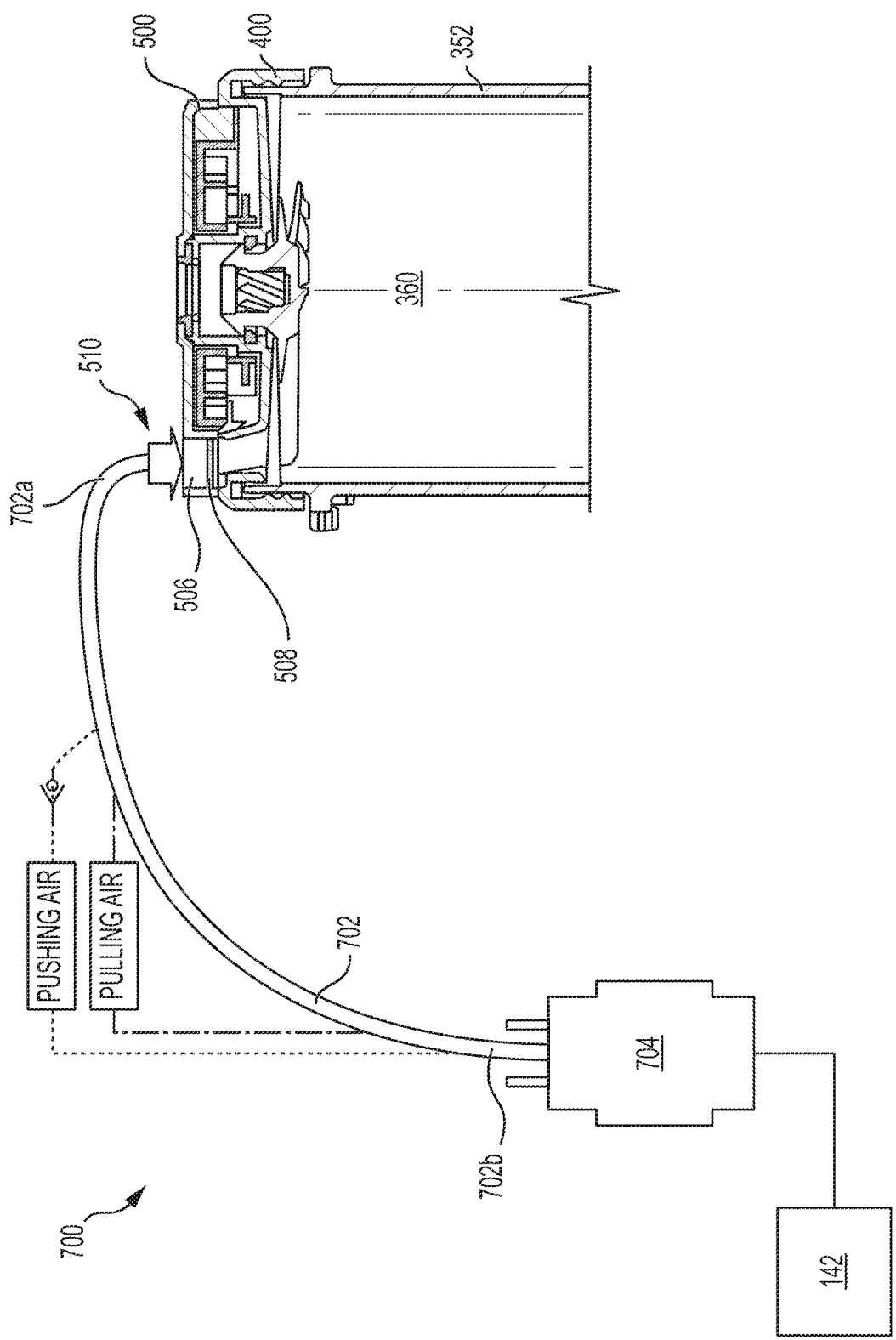
FIG. 5 illustrates an aeration system, according to some embodiments of the disclosure.

FIG. 5 illustrates an aeration system 700 for use with the micro-puree machine 10, according to some embodiments of the disclosure. As shown in FIG. 5, the aeration system 700 may comprise an opening 506 in the coupling 500. When the bowl 352 is in the first configuration, the interior volume 360 may be substantially sealed from ambient air. The opening 506 may include a filter 508 for filtering dust particles and debris from entering the interior volume 360. A first end 702*a* of a tube 702 may operatively attach to the opening 506 via a pliable stopper 510 (for example, a silicone bung) such that the tube 702 is in fluid communication with the interior volume 360. A second end 702*b* of the tube 702 may operatively couple to a pump 704 or other mechanism for forcing fluids (e.g., pushing air) in fluid communication with the tube 702. The pump 704 may be operable to change a pressure of the interior volume 360 of the bowl 352 by selectively pumping gas (e.g., air) into or pulling gas (e.g., air) out of the interior volume 360 during processing. The addition of air or gas to the ingredients during processing may allow a user to change a density and texture of the final product. For example, processing the ingredient under a high pressure (for example, 8 psi) results in a lighter and airier output. In embodiments, the aeration system 700 may be integrated into a processing program on the user interface 142 with a predetermined processing time and aeration percentage. The disclosure also contemplates that the user interface 142 would have a separate aeration input to allow for further user control.

While embodiments of the disclosure including performing processing and extrusion using a same driven shaft, in some embodiments, processing and extrusion are performed on different shafts, as will now be described.

Figure 6A:
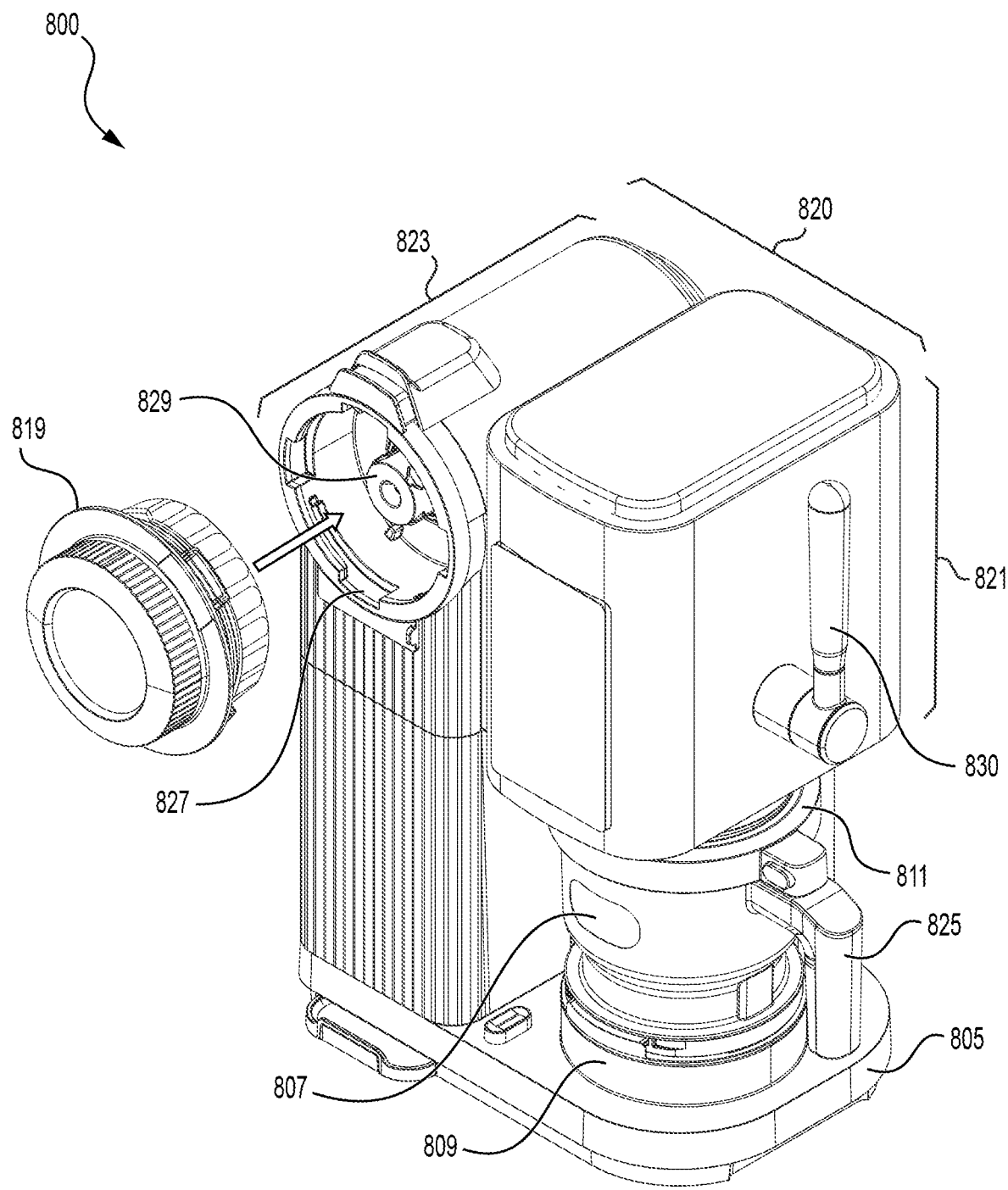
FIGS. 6A-6L illustrate another micro-puree machine, according to some embodiments of the disclosure.
Figure 6B:
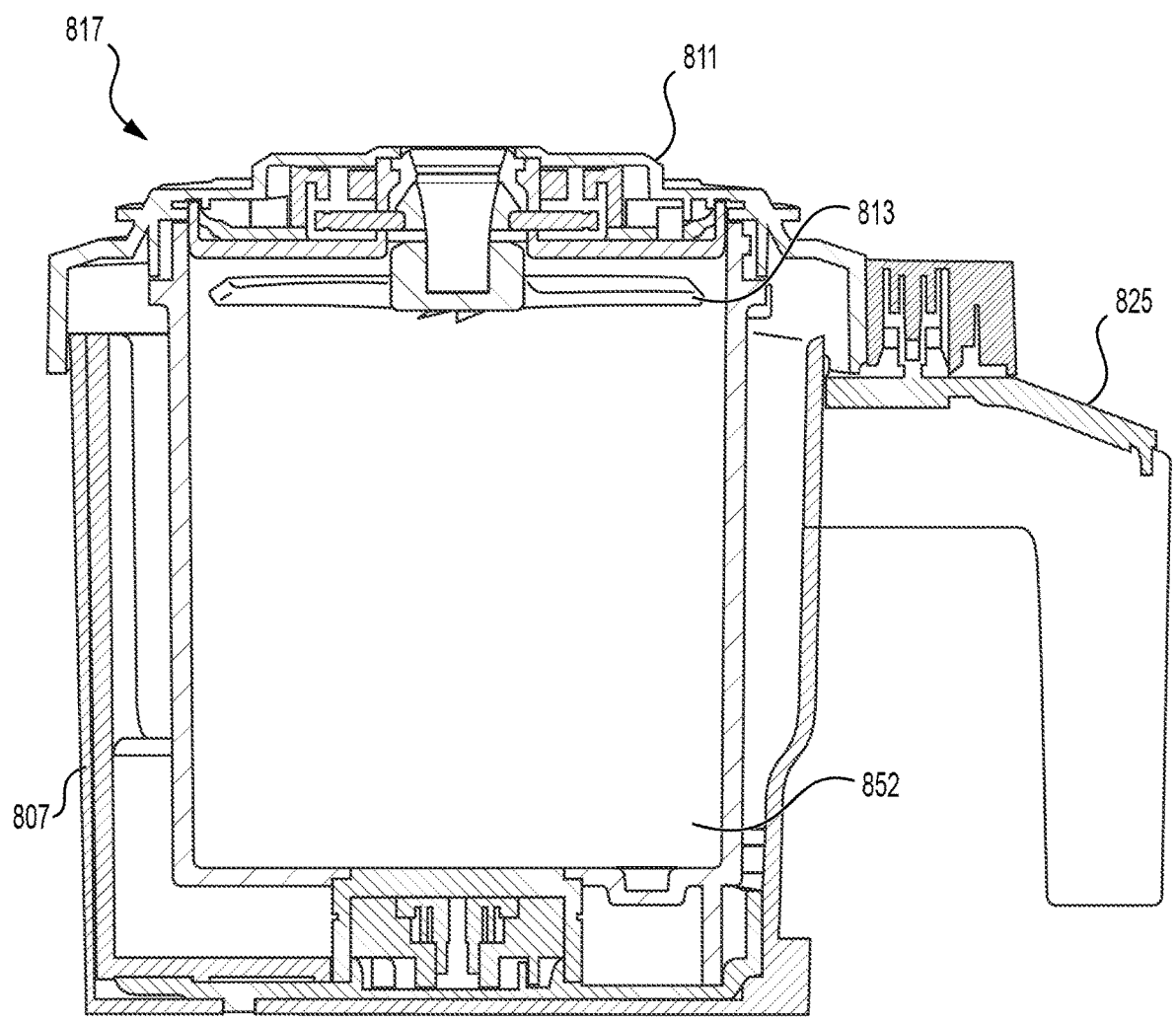
Figure 6C:
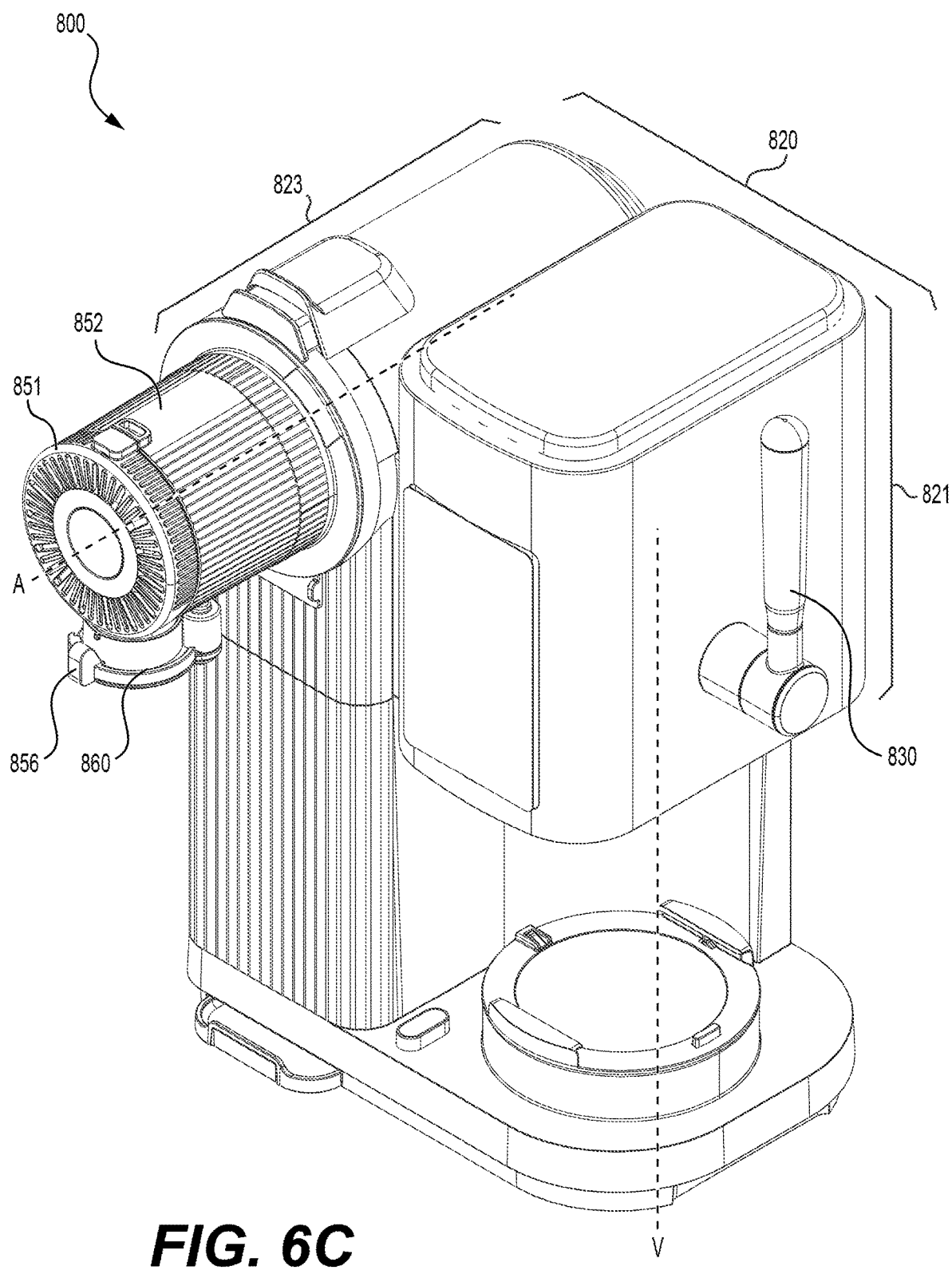
Figure 6D:
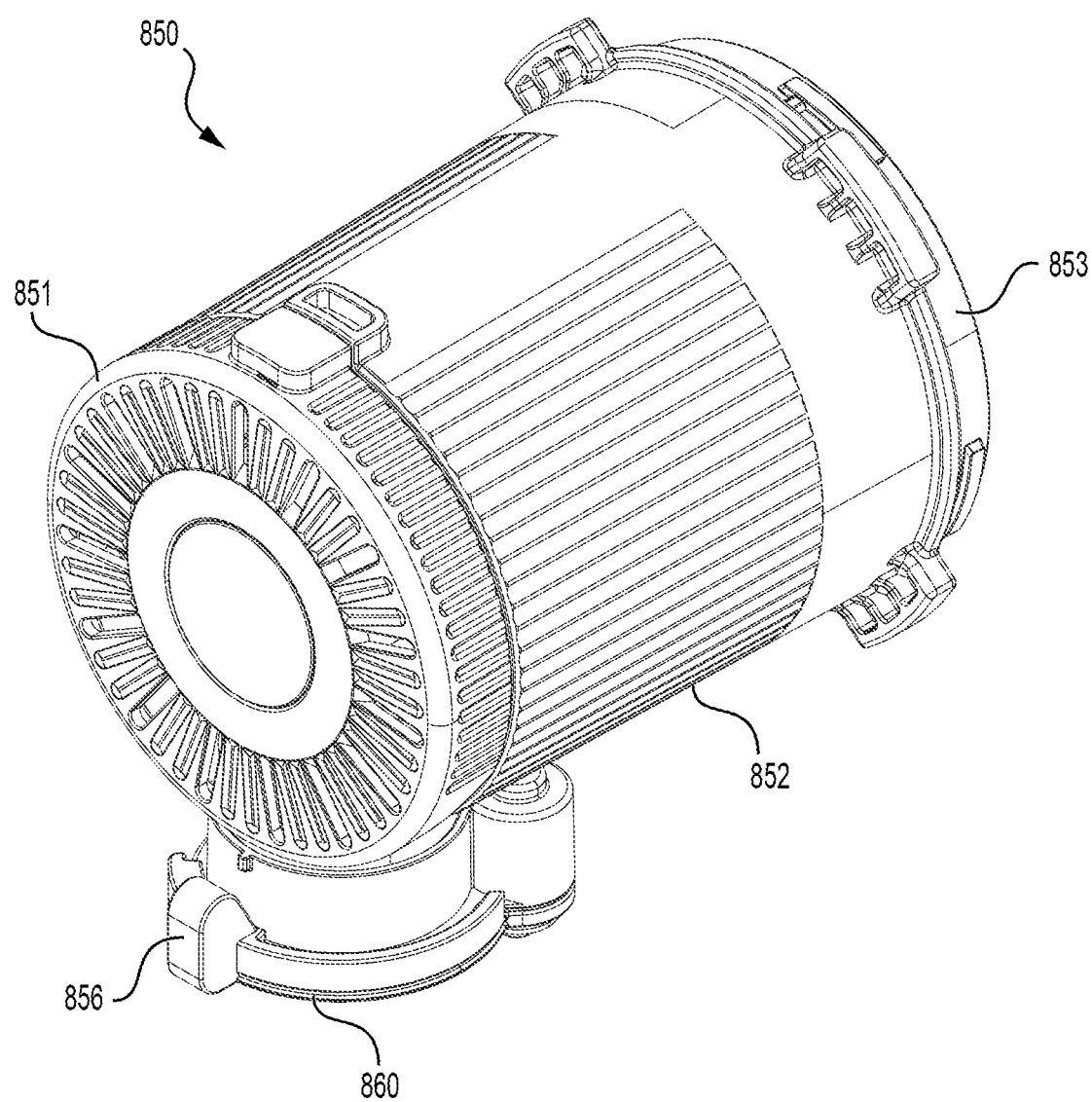
Figure 6E:
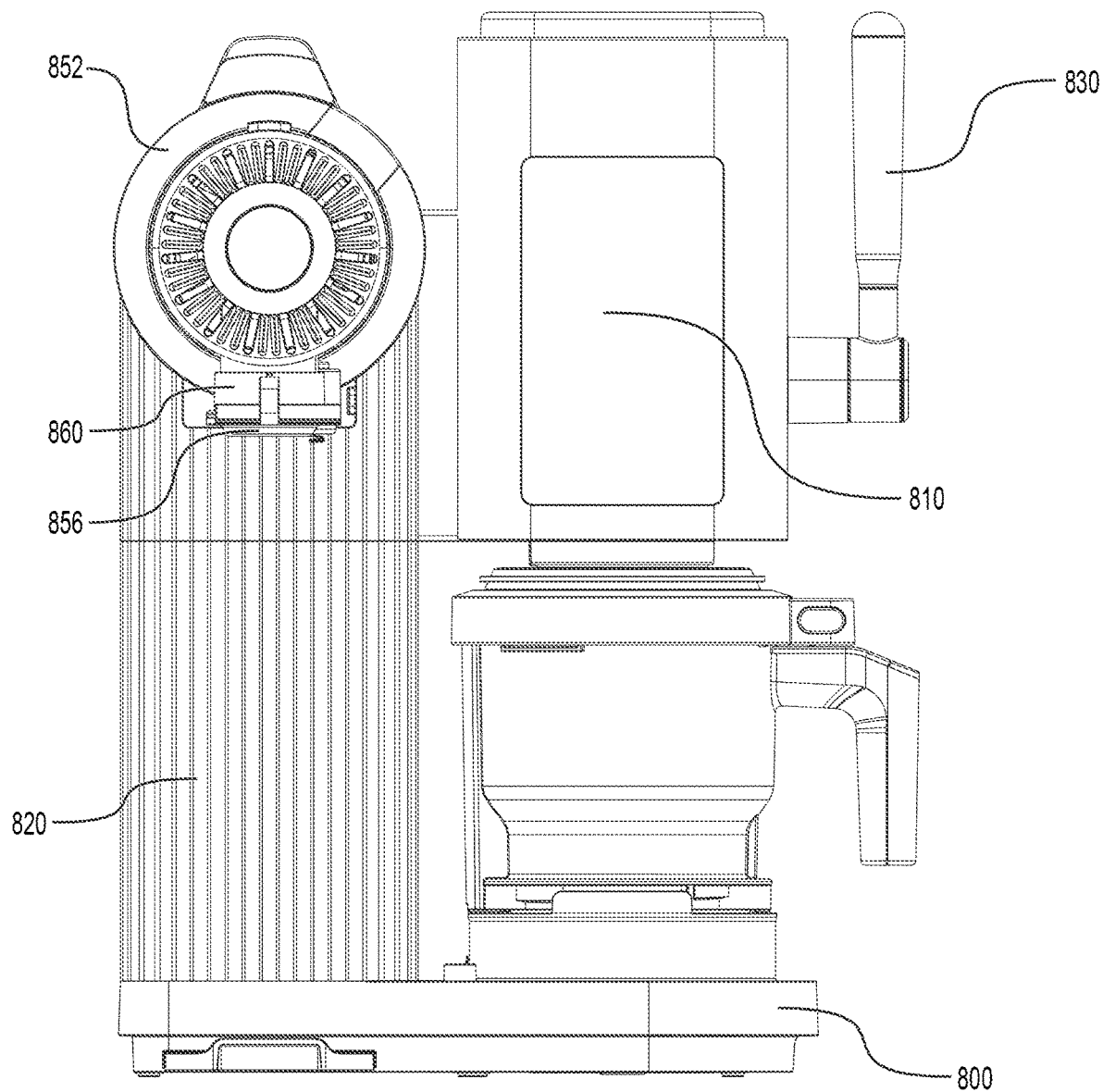
Figure 6F:
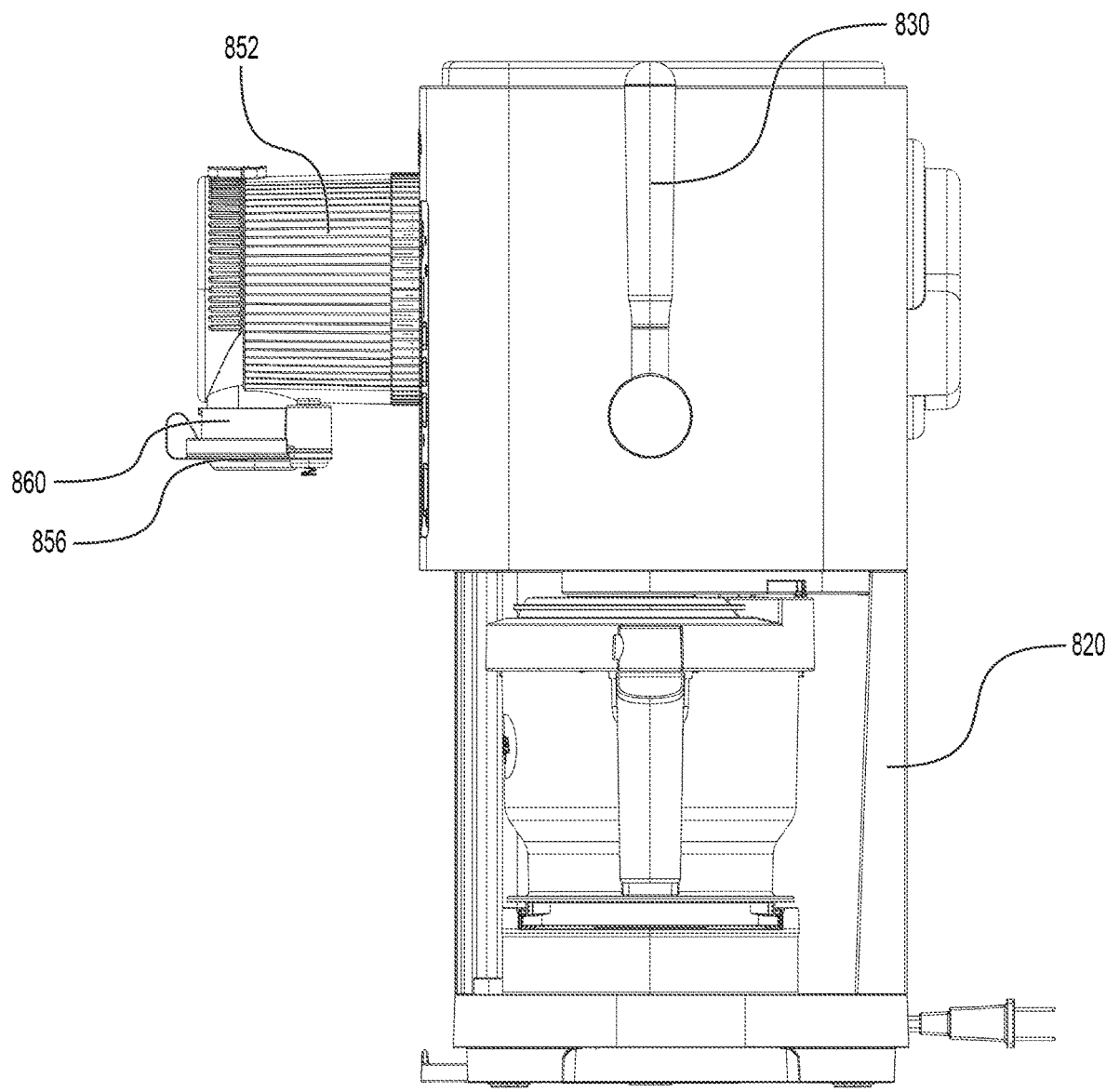
Figure 6G:
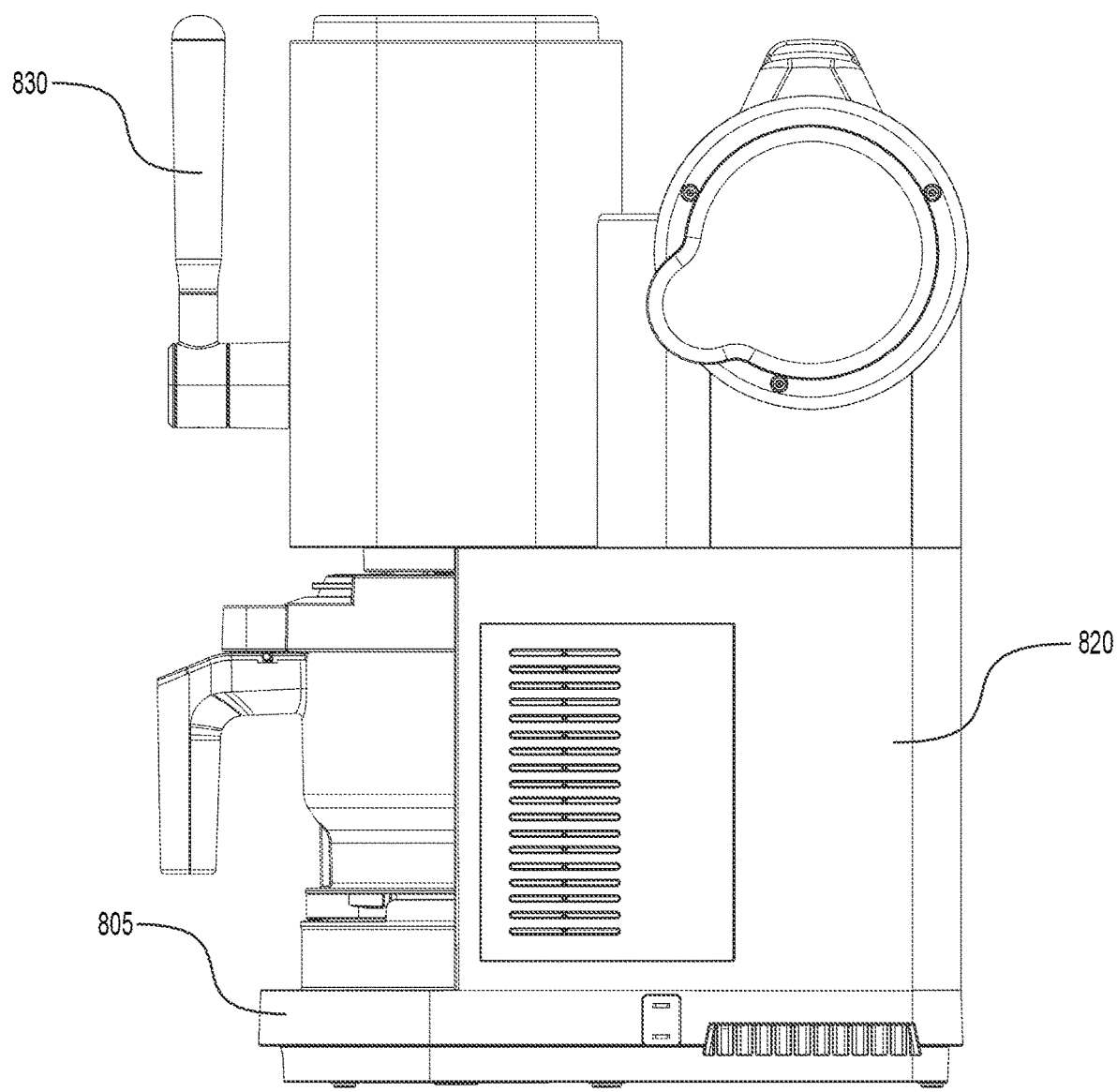
Figure 6H:
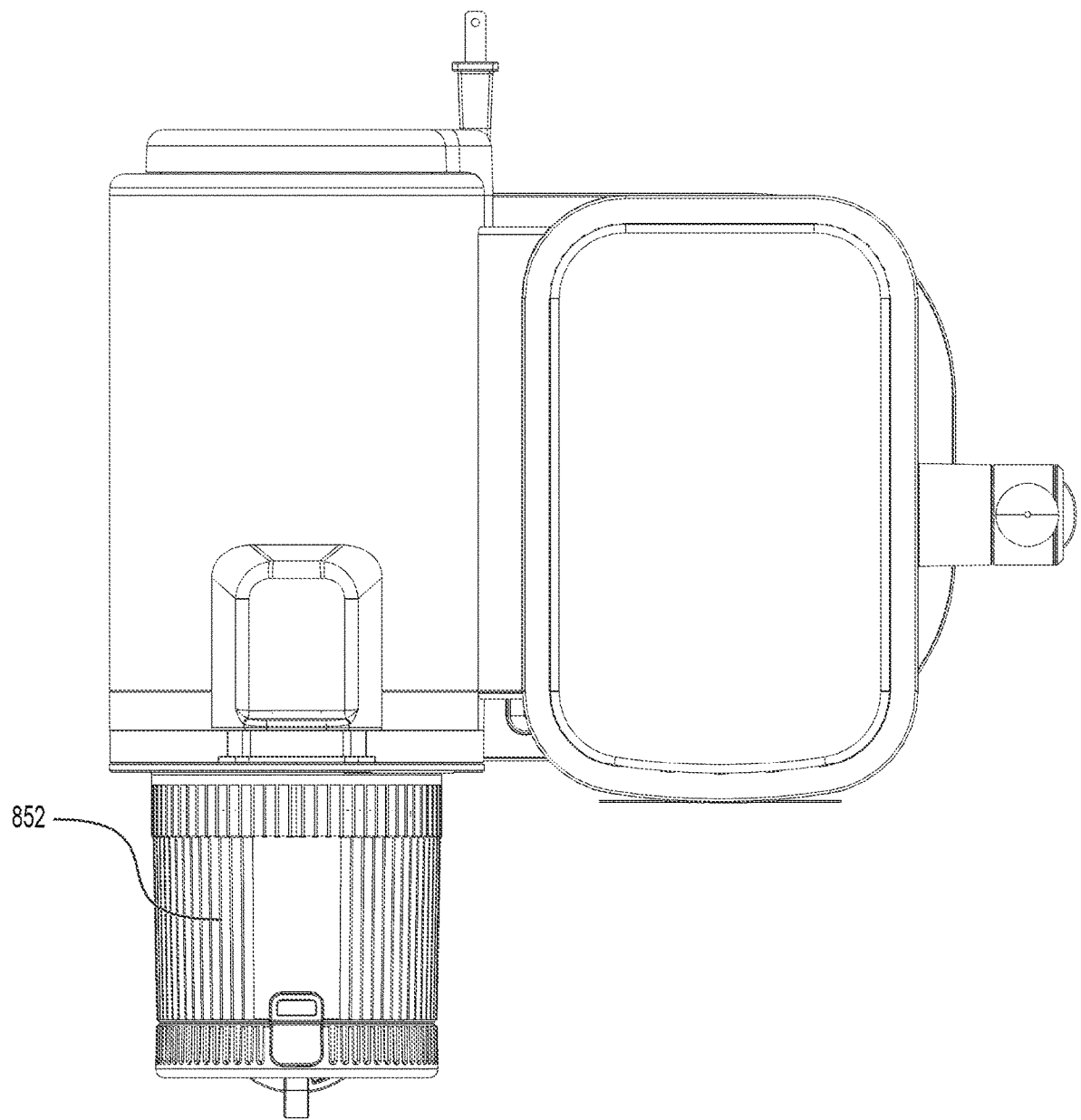
Figure 6I:
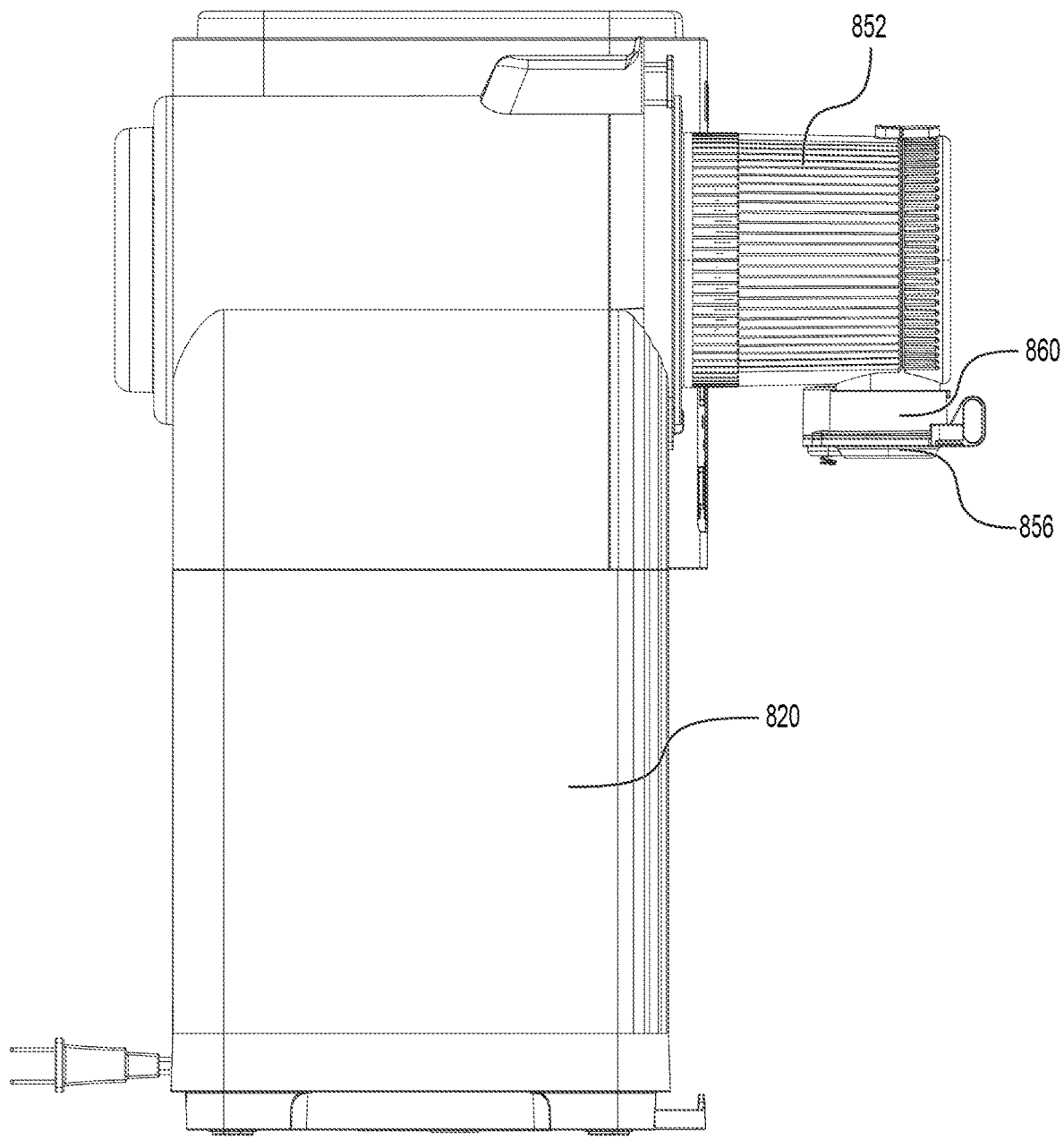

FIGS. 6A-6L illustrate another micro-puree machine 800, according to some embodiments of the disclosure. FIGS. 6A and 6B illustrate an embodiment of micro-puree machine 800 in a first configuration for processing (e.g., micropureeing), which may be referred to herein as a processing configuration. FIGS. 6C and 6D illustrate an embodiment of micro-puree machine 800 in a first configuration for extruding, which may be referred to herein as an extruding or extrusion configuration. FIGS. 6E-6L illustrate an embodiment of micro-puree machine 800 in both processing and extruding configurations merely for illustrative purposes, as in some embodiments, the micro-puree is not configured to perform processing and extruding concurrently.

The micro-puree machine 800 may include a base 805 and a housing 820. The housing 820 may include a user interface 810 for receiving user inputs to control the micro-puree machine 800 and/or display information. In some embodiments, the micro-puree machine includes a processing sub-module 821 including one or more components configured to process ingredients in a bowl 852 (e.g., bowl 352 or a variation thereof) and an extruding sub-module 823 including one or more components configured to extrude processed ingredients from the bowl 852. In a processing configuration, the bowl 852 may be coupled to the interior of an outer bowl 807 that is mounted on a processing platform 809 mounted to the base 805. The bowl 852 may be coupled to a lid 811 (e.g., lid 442 or a variation thereof) that houses a blade assembly 813 (e.g., blade 300 or a variation thereof). The bowl 852 may include a nozzle control assembly 851 (e.g., a dial) that enables a user to control an opening or closing of a nozzle 860, a nozzle 860, and a hinged stopper or plug 856 that can be used by a user to selectively cover the nozzle 860, or the control assembly 851. In some embodiments, the nozzle control assembly 851, the nozzle 860, and the stopper 856 may be removably attachable to the bowl 852. Using the handle 825, a user may rotate and elevate the processing bowl assembly 817 into a processing position in which the blade assembly 813 engages with a driven shaft 854, the lid 811 couples to the micro-puree machine, and the blade 300 is released from the lid 811 so the driven shaft 854 can drive the shaft 854, for example, as described in the '765 patent. By engaging the user interface (or via a remote interface wirelessly connected to a wireless interface within housing 820), the user may initiate processing of the ingredients in the bowl 852. In a processing configuration, extruding sub-module 823 may remain idle, and a cap or plug 819 may be coupled to a coupling 827, covering an interface 829 with driven shaft 858.

After the processing of the ingredients, the processing bowl assembly 817 may be decoupled from the micro-puree machine 810 (e.g., from the processing sub-module 821), and de-mounted from the platform 809. The lid 811 may be removed from the outer bowl 807, and bowl 852 removed from the outer bowl 807. A lid 853 then may be mounted to the bowl 852, and the bowl 852 then may be coupled to the micro-processing machine 810 (e.g., to the extruding sub-module 823) in an extruding configuration.

In the extruding configuration, the bowl 852 may be coupled to a lid 853 (e.g., lid 452 or a variant thereof) that includes a plunger. The combination of the bowl 852 and the lid 853 may be referred to herein as a bowl extruding assembly 850. In embodiments, the bowl extruding assembly 850 may be configured to be installed to the micro-puree machine 800 such that the nozzle 860 faces vertically downwards when the bowl extruding assembly 850 is properly installed. The bowl extruding assembly 850 may be assembled to the housing 820 (e.g., the extruding sub-module 823) such that a central axis A of the bowl extruding assembly 850 extends perpendicular to a vertical axis V of the housing 820, as shown. The bowl extruding assembly 850 may include an outlet 860 for extruding processed ingredients from the bowl extruding assembly 850. The micro-puree machine 800 also may include a lever 830 for manually activating a plunger 802 to extrude processed ingredients within the bowl extruding assembly 850 through the outlet 860.

While the lever 830 is illustrated on a right side of the machine 800 (from the front view shown in FIG. 6B), the disclosure is not so limited. The lever 830 may be on the left side of, or another location on, the machine 800, and other components of the machine may be rearranged to accommodate the different location of the lever 830. The housing 820 may include electrical, electromagnetic, mechanical and/or electro-mechanical components to translate a pulling down or pushing up of the lever 830 into movement of a plunger (e.g. plunger 802) within the bowl 852.

Embodiments of the housing 820 of micro-puree machine 800 may house a transmission system that includes a driven shaft 854 for engaging the blade 300, a separate driven shaft 858 for engaging the plunger 802, on ore more gearing systems, and one or more position and/or drive motors for moving the driven shaft 854 and the other shaft 858 rotationally and/or axially to process the ingredients in the bowl assembly 850. For example, a drive motor may drive the rotation of the driven shaft 854 and blade (e.g., blade 300) coupled thereto, and a position motor may drive the vertical (e.g., down and up) movement of the driven shaft 854 and a blade. Another motor may drive the second shaft 858 and a plunger (e.g., plunger 454 or 602) attached thereto. In embodiments, the blade 813 may be programmably controlled at the user interface 810 by a computing system to operate at different rotational speeds and moved up and down in different patterns and speeds, and for different periods of time, to make different food items. In embodiments, the plunger in the lid 853 may be programmably controlled at the user interface 810 by a computing system to operate at different rotational speeds and moved up and down in different patterns and speeds, and for different periods of time, to make different food items. Some non-limiting examples of a transmission system and the computing system are shown in described in the '765 patent and in U.S. Pat. No. 11,882,965 to SharkNinja Operating, LLC (the '965 patent), the entire contents of which are hereby incorporated by reference.

Figure 6J:
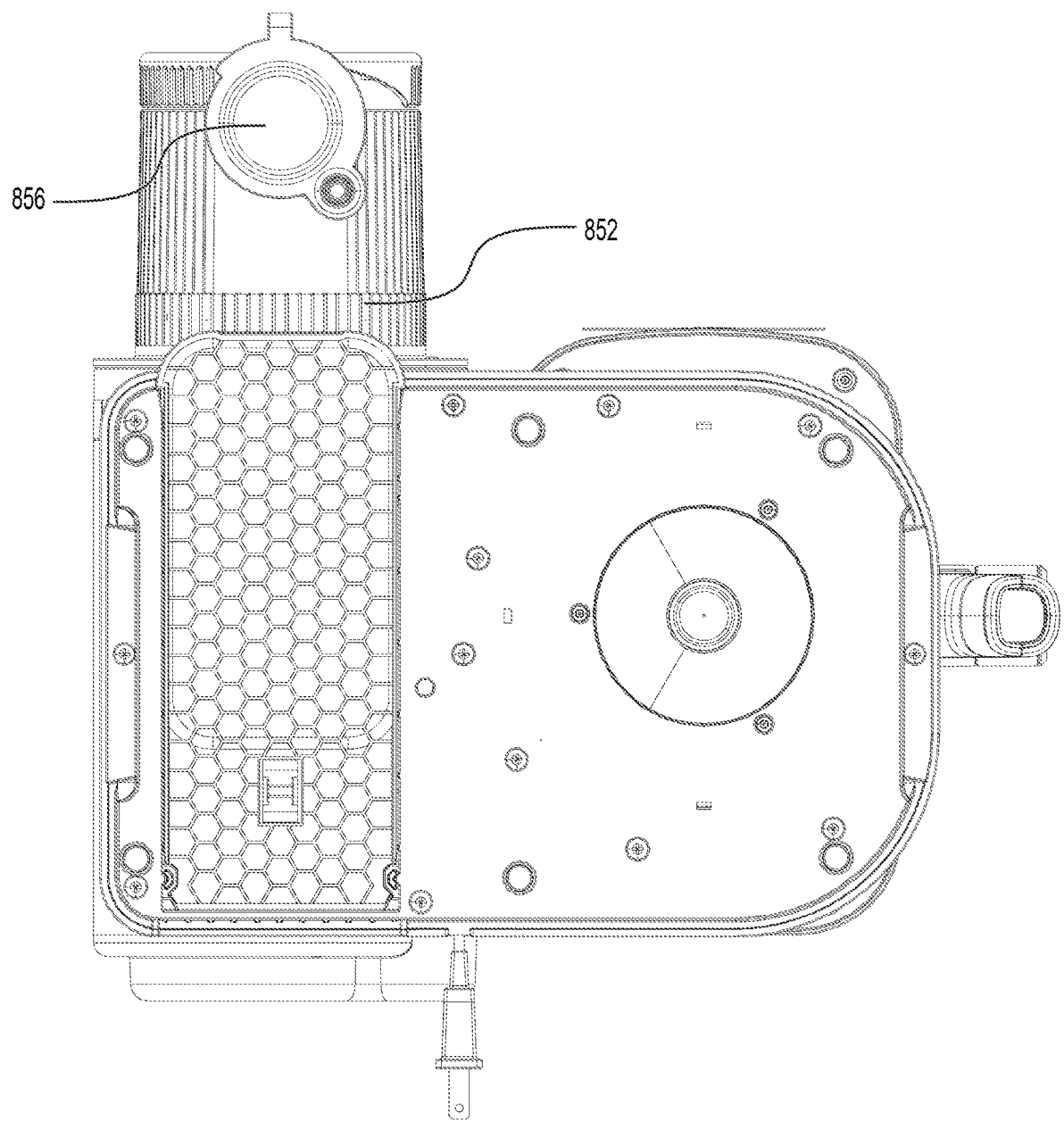
Figure 6K:
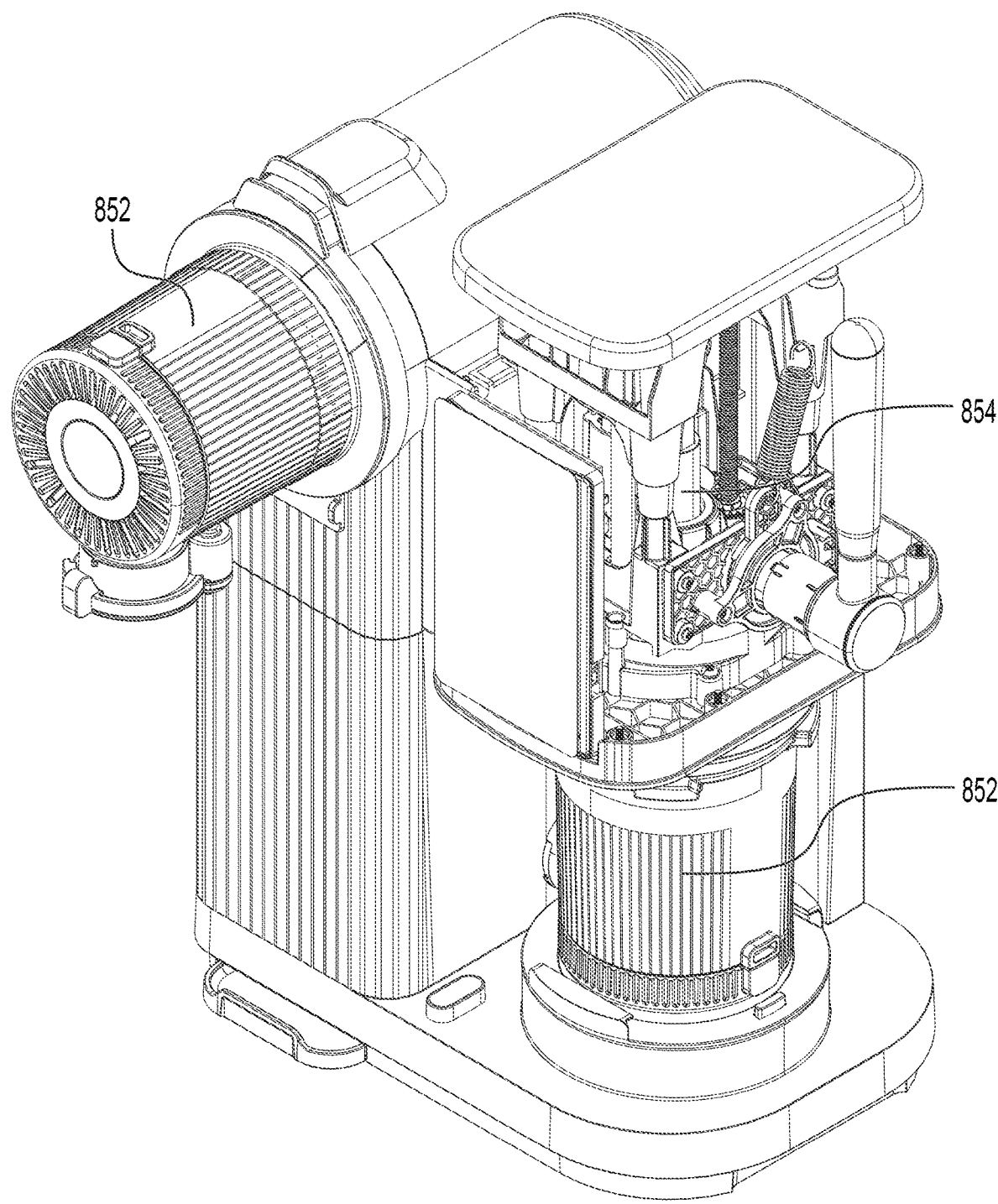
Figure 6L:
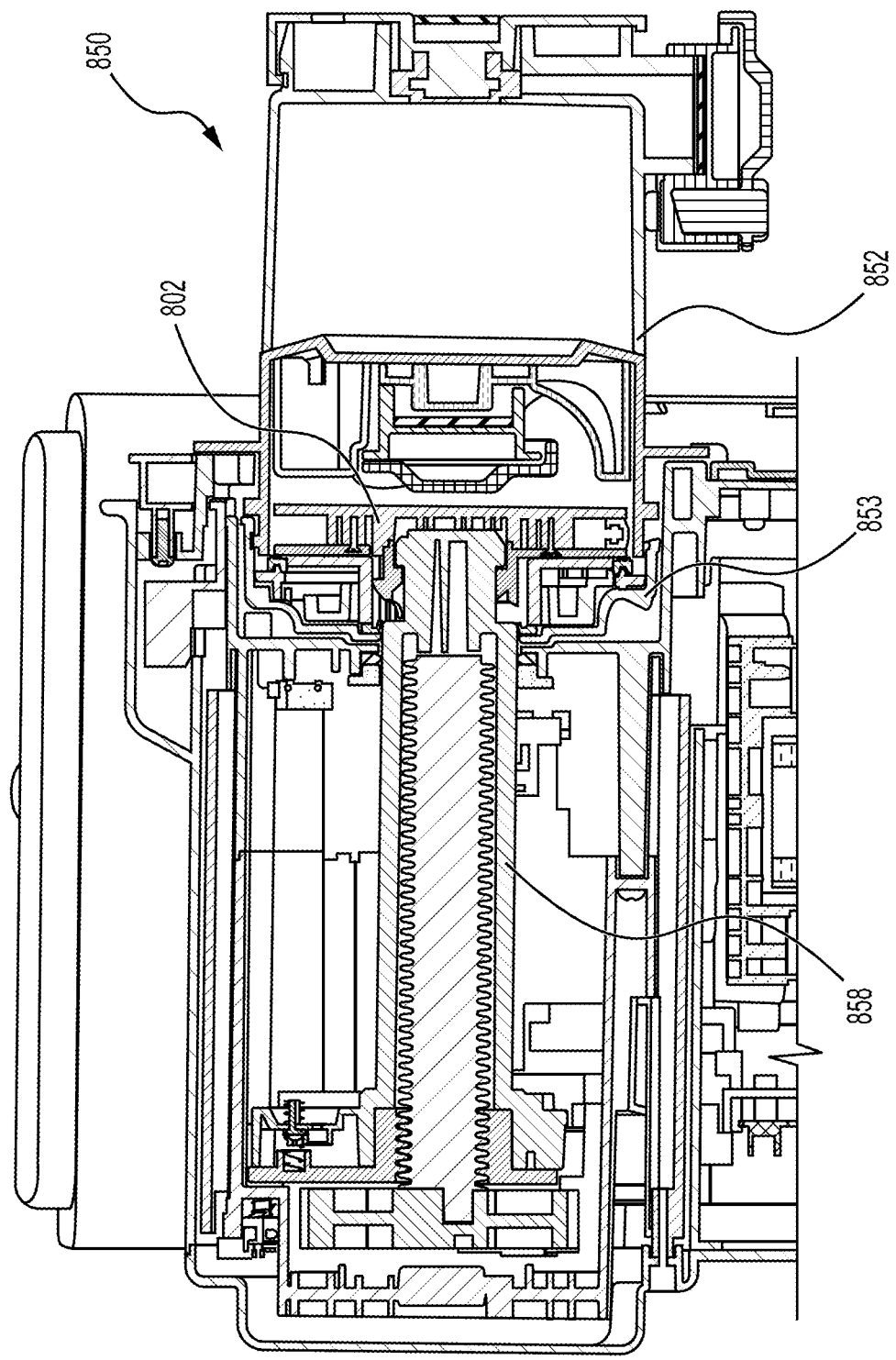
Figure 6M:
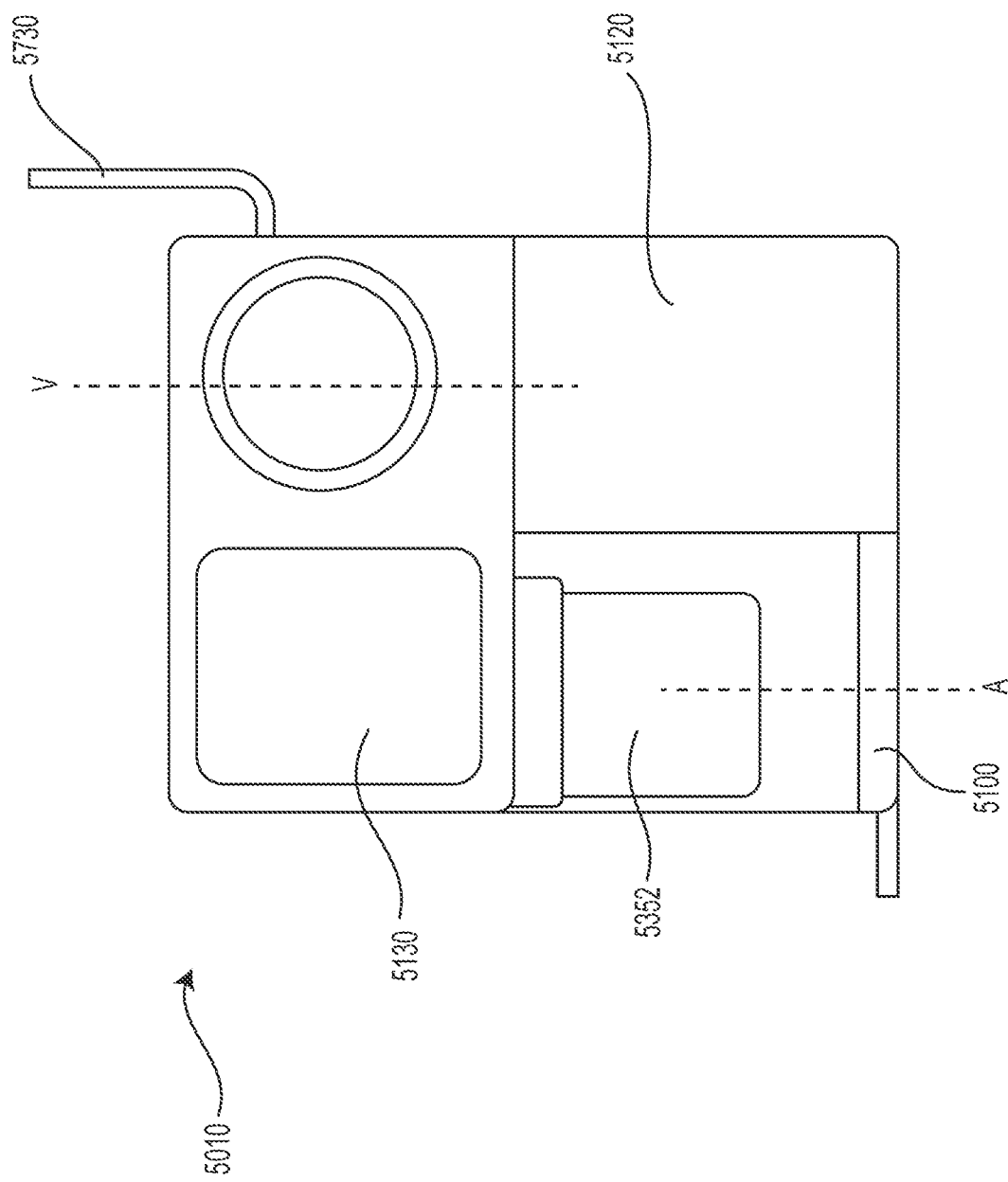
FIG. 6M illustrates another micro-puree machine, according to some embodiments of the disclosure.

FIG. 6M shows an isometric view of a micro-puree machine 5010, according to another embodiment of the disclosure. The micro-puree machine 5010 may be used to process ingredients on one shaft and extrude the processed ingredients on another shaft. As shown in FIG. 6M, the micro-puree machine 5010 may include a base 5100, a housing 5120, and an extrusion module 5130. The housing 5120 may include a user interface (not shown) for receiving user inputs to control the micro-puree machine 5010 and/or display information. The micro-puree machine 5010 also may include a bowl 5352. The bowl 5352 may be assembled to the housing 5120 such that a central axis A of the bowl 5352 extends parallel to a vertical axis V of the housing 5120, as shown. However, the disclosure contemplates that the bowl 5352 may be assembled to the housing 5120 such that the central axis A extends at an angle of between 0 and 90° to the vertical axis V, or such that the central axis A extends perpendicular to the vertical axis V.

The extrusion module 5130 may be configured to couple to a bowl assembly as described herein, for example, a bowl having a lid with e a plunger housed therein. The extrusion module 5130 also may include a motor and transmission to drive a driven shaft to move the plunger with the bowl during extrusion, for example, as described elsewhere herein. The micro-puree machine 5010 also may include a lever 5730 for activating the plunger to extrude processed ingredients from the bowl 5352 through an integrated nozzle in the bowl 5352 (not shown). The housing 5120 may include electrical, electromagnetic and/or mechanical components the translate a pulling down or pushing up of the lever into movement of the plunger within the bowl.

The nozzle may be integrated with the bottom surface of the bowl 5352 such that nozzle faces vertically downwards when the bowl 5352 is properly installed. In the embodiment of FIG. 6J, the plunger may be configured to extrude the processed ingredients from the bowl 5352 using a separate shaft (not shown) from a driven shaft (e.g., 250) that rotates a blade (e.g., 300). In further embodiments, the separate shaft may be manually driven by the user by cranking the lever 5730.

Figure 7A:
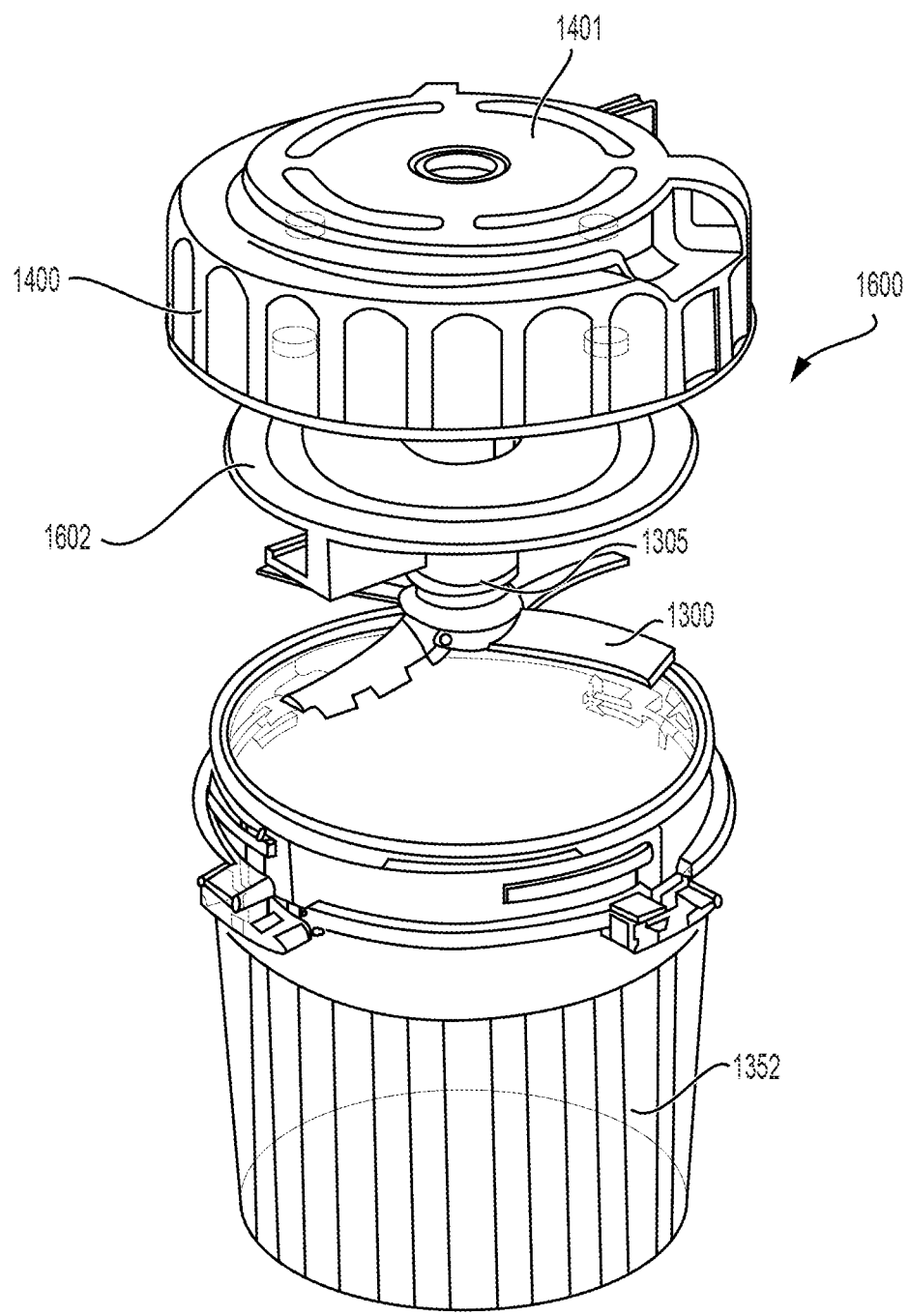
FIGS. 7A-7D illustrate another extrusion assembly, according to some embodiments of the disclosure.
Figure 7B:
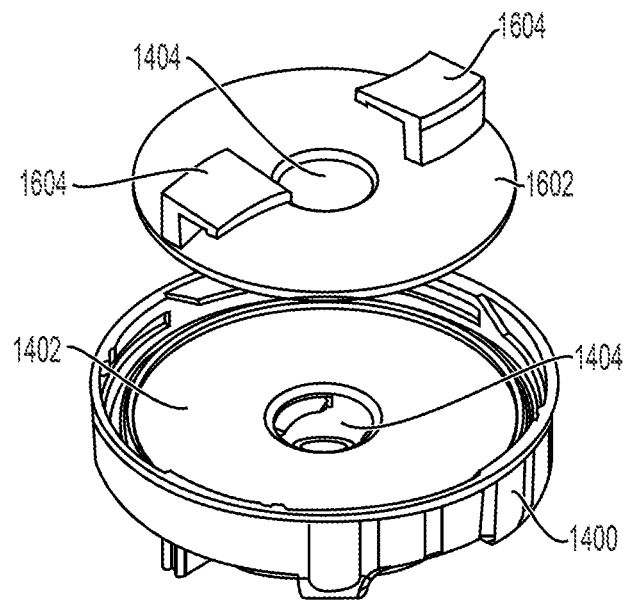
Figure 7C:
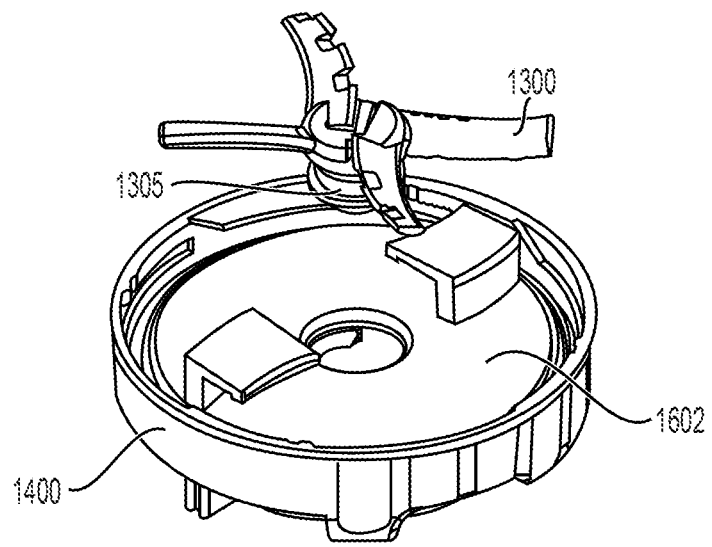
Figure 7D:
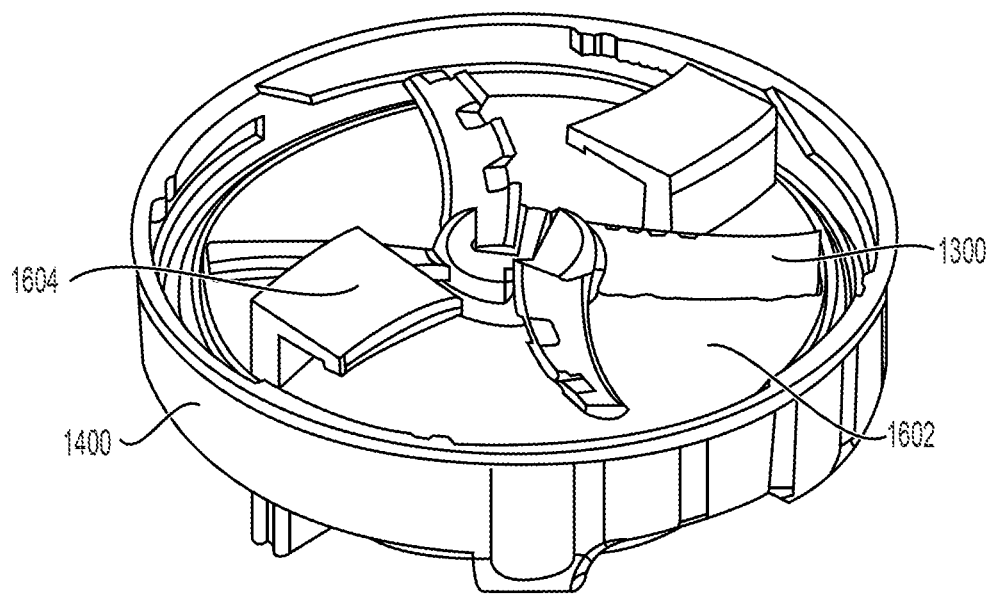

FIGS. 7A-7D illustrate another extrusion assembly 1600 in which the plunger 1602 and the blade 1300 may be installed to the same lid 1400, according to some embodiments of the disclosure. As shown in FIG. 7A, the plunger 1602, alone or in combination with other components (e.g., the lid 1400, a bowl 1352, and a nozzle), may constitute the extrusion assembly 1600 for extruding processed ingredients from the bowl 1352. In some embodiments, the bowl 1352 may be the bowl 352. The lid 1400 may define a central opening 1401 configured to allow the passage of the driven shaft 250. The blade 1300 may include a central support hub 1305 for engaging the driven shaft 250 to rotate and translate the blade 1300. As shown in FIG. 7B, the plunger 1602 may be couplable to an underside of the lid 1400. For example, the plunger 1602 may magnetically couple to a metal ring 1402 on the underside of the lid 1400. However, the disclosure contemplates other coupling mechanisms of the plunger 1602 and the lid 1400. Both the plunger 1602 and the metal ring 1402 may define openings 1404 alignable with the opening 1401 of in the lid 1400. The plunger 1602 may further include at least one retainer element 1604, as further described elsewhere herein. As shown in FIG. 7C, once the plunger 1602 has been installed on the lid 1400, a user may couple the blade 1300 to an underside of the plunger 1602 such that the central support hub 1305 extends through the openings 1404 and the blade 1300 is not blocked by the retainer elements 1604 (FIG. 7D). In use, to process ingredients within the bowl 1352, the driven shaft 250 may operate to descend the blade 1300 passed the retainer elements 1604 and away from the plunger 1602 before it begins to rotate to process the ingredients within the bowl 1352. After processing, the blade 1300 may return to its initial position against the plunger 1602. Then, to extrude the ingredients from the bowl 1352, the driven shaft 250 may operate to slightly rotate the blade 1300 such that the blade 1300 is retained against the plunger 1602 by the retaining elements 1604. Then, the driven shaft 250 may exert sufficient force to overcome the magnetic coupling between the lid 1400 and the plunger 1602 to descend both the blade 1300 and plunger 1602 through the bowl 1352 to extrude the processed ingredients through the nozzle 608.

Figure 8A:
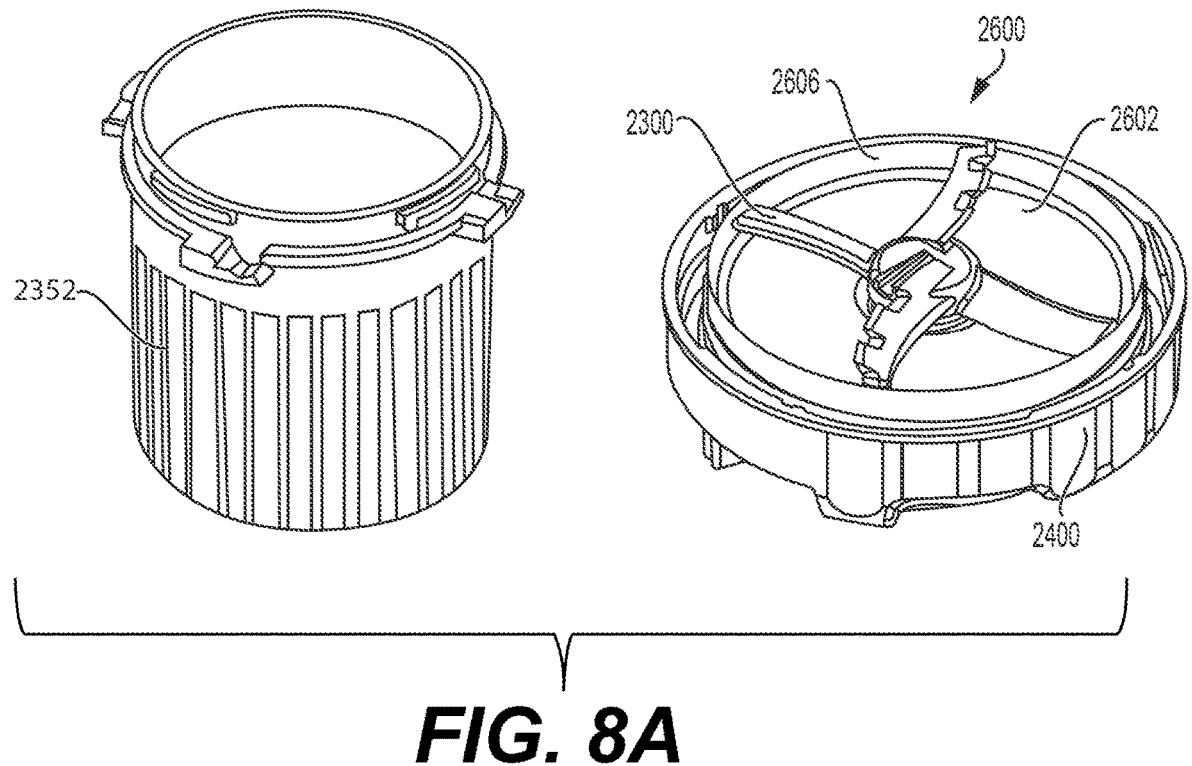
FIGS. 8A-8C illustrate another extrusion assembly, according to some embodiments of the disclosure.
Figure 8B:
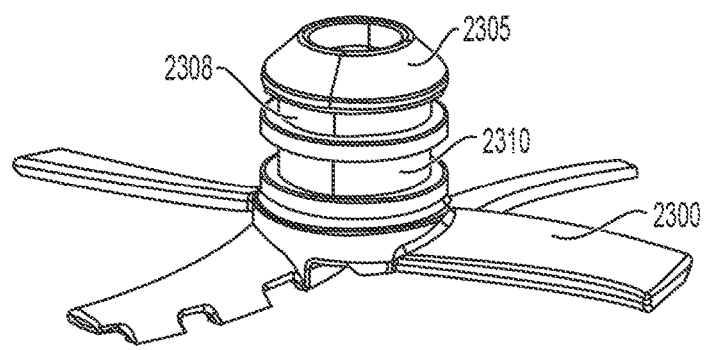
Figure 8C:
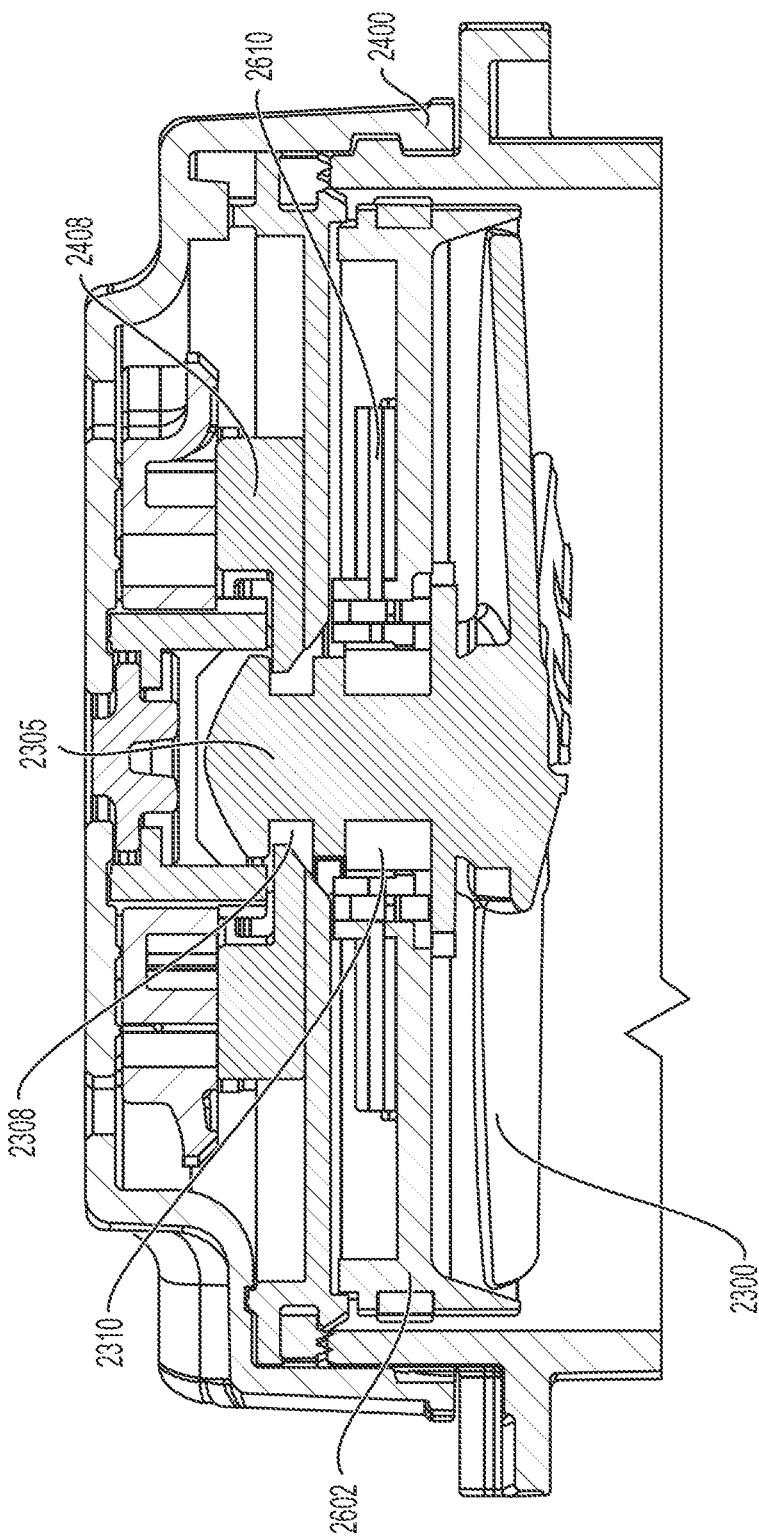

FIGS. 8A-8C illustrate another extrusion assembly 2600 in which the plunger 2602 and the blade 2300 may be installed to the same lid 2400, according to some embodiments of the disclosure. As shown in FIG. 8A, a plunger 2602, alone or in combination with other components (e.g., a lid 2400, a bowl 2352, and a nozzle), may constitute the extrusion assembly 2600 for extruding processed ingredients from the bowl 2352. In some embodiments, the bowl 2352 may be the bowl 352 including the centrally located opening 604 alignable with nozzle 608 (FIG. 4C). In other embodiments, the bowl 2352 may be the bowl 352, 352' or 852.

A user may assemble the extrusion assembly 2600 in a similar manner to the extrusion assembly 1600 of FIGS. 7A-7D. For example, the plunger 2602 may be magnetically or otherwise couplable to an underside of the lid 2400. Once the plunger 2602 has been installed on the lid 2400, a user may couple the blade 2300 to an underside of the plunger 2602 such that the blade 2300 is housed within a circumferential wall 2606 of the plunger 2602. As shown in FIG. 8B, the central support hub 2305 of the blade 2300 may include an upper groove 2308 and a lower groove 2310. As shown in FIG. 8C, the lid 2400 may include a first set of engagement features, such as primary clips 2408, that are biased (e.g., spring biased) toward the central support hub 2305. As the user installs the blade 2300 to the lid 2400, the primary clips 2408 may engage the upper groove 2308 of the central support hub 2305. In this configuration, a second set of engagement features on the plunger 2602, such as secondary clips 2610, are disengaged from the lower groove 2310 such that the blade 2300 can be driven axially and rotationally by the driven shaft 250 independent of the plunger 2602.

Figure 8D:
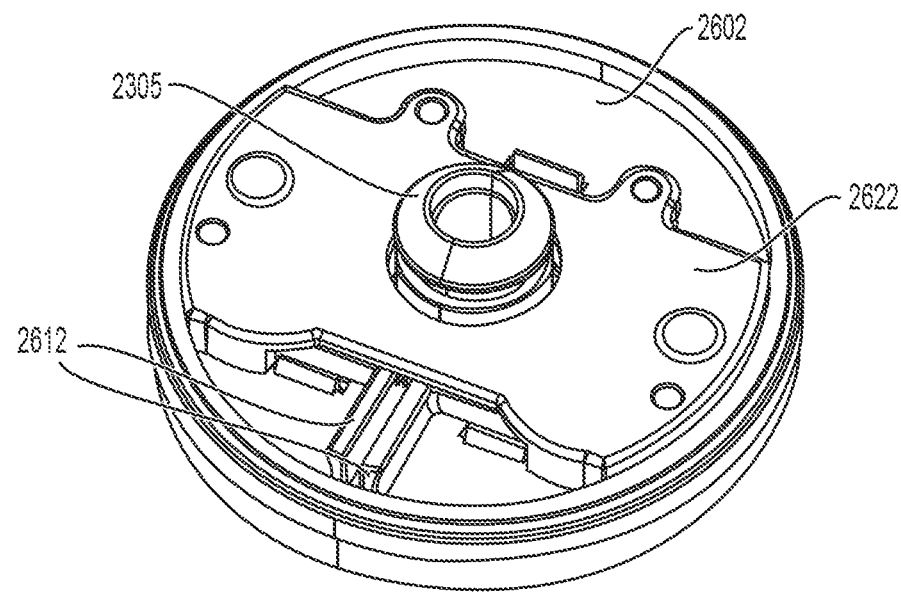
Figure 8E:
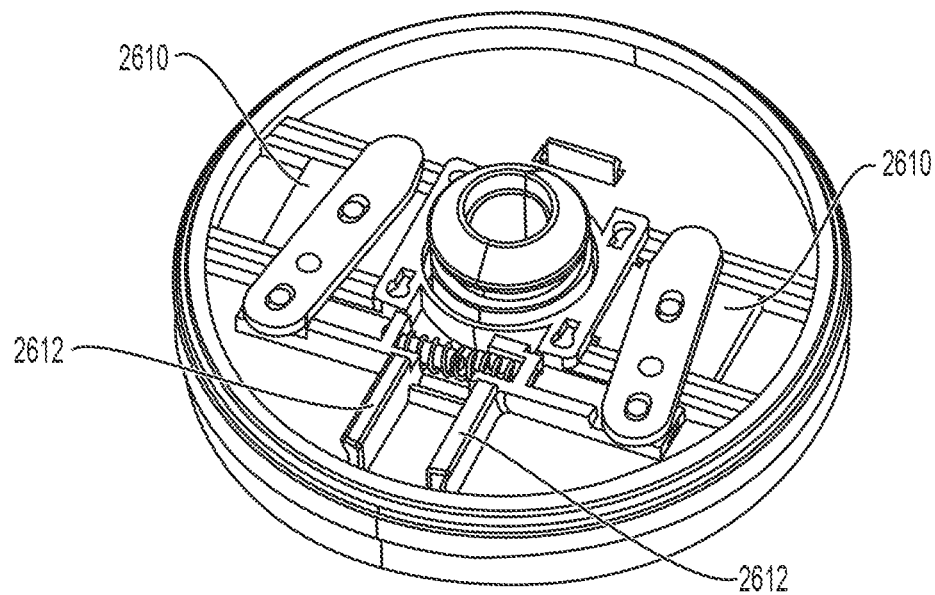
Figure 8F:
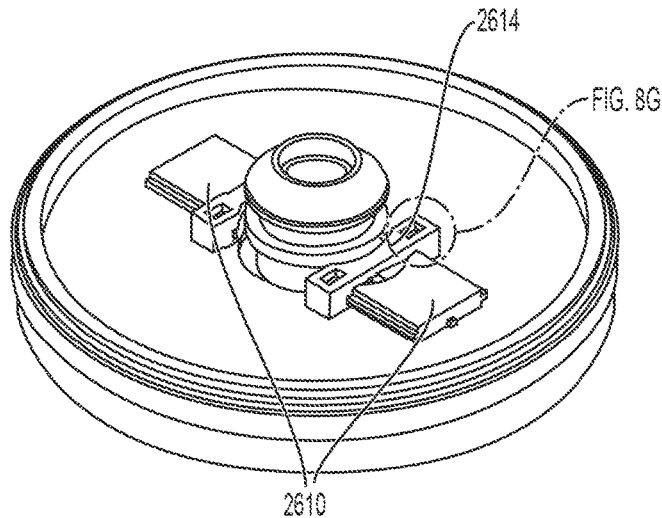
Figure 8G:
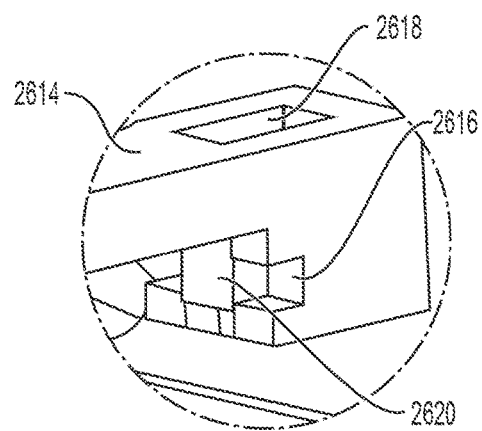
Figure 8H:
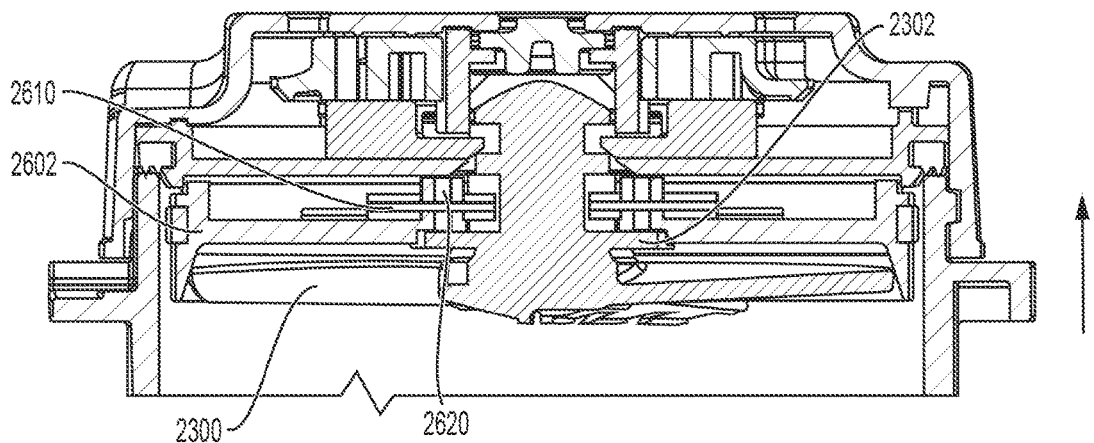

FIGS. 8D-8I illustrate the configuration and movement of the secondary clips 2610 according to some embodiments of the disclosure. As shown in FIG. 8D, an upper surface of the plunger 2602 may comprise a set of moveable levers 2612 disposed within a housing 2622 that is configured to allow for passage of the central support hub 2305. As shown in FIG. 8E, the levers 2612 may be operatively coupled to the secondary clips 2610 such that the levers 2612 are positioned apart when the secondary clips 2610 are engaged with the lower groove 2310. As shown in FIG. 8F, the secondary clips 2610 may be moveable through opposing bridge members 2614 on the upper surface of the plunger 2602, as shown in more detail in FIG. 8G. An inner surface of the bridge members 2614 may define opposing slots 2616. The bridge members 2614 may further define channels 2618 for passage of blocking members 2620. While the blade 2300 is processing ingredients within the bowl 2352, the blocking members 2020 may block the slots 2616 such that the secondary clips 2610 are prevented from moving through the bridge members 2614 and engaging the lower groove 2310, thus preventing the plunger 2602 from engaging the driven shaft 2250. As shown in FIG. 8H, to engage the plunger 2602 to the central support hub 2305 during the extrusion phase, the blade 2300 may move slightly upward such that a platform 2302 on the blade 2300 causes the blocking members 2020 to move upwards through the channels 2618, thus unblocking the slots 2616. As shown in FIGS. 8I and 8J, once the blocking members 2620 no longer block the slots 2616, the secondary clips 2610 may move through the bridge members 2614 to engage the lower groove 2310. In this configuration, both the blade 2300 and plunger 2602 are operatively engaged with the driven shaft 250 such that both the blade 2300 and the plunger 2602 can be descended through the bowl 2352 to extrude the processed ingredients from the bowl 2352.

Figure 9A:
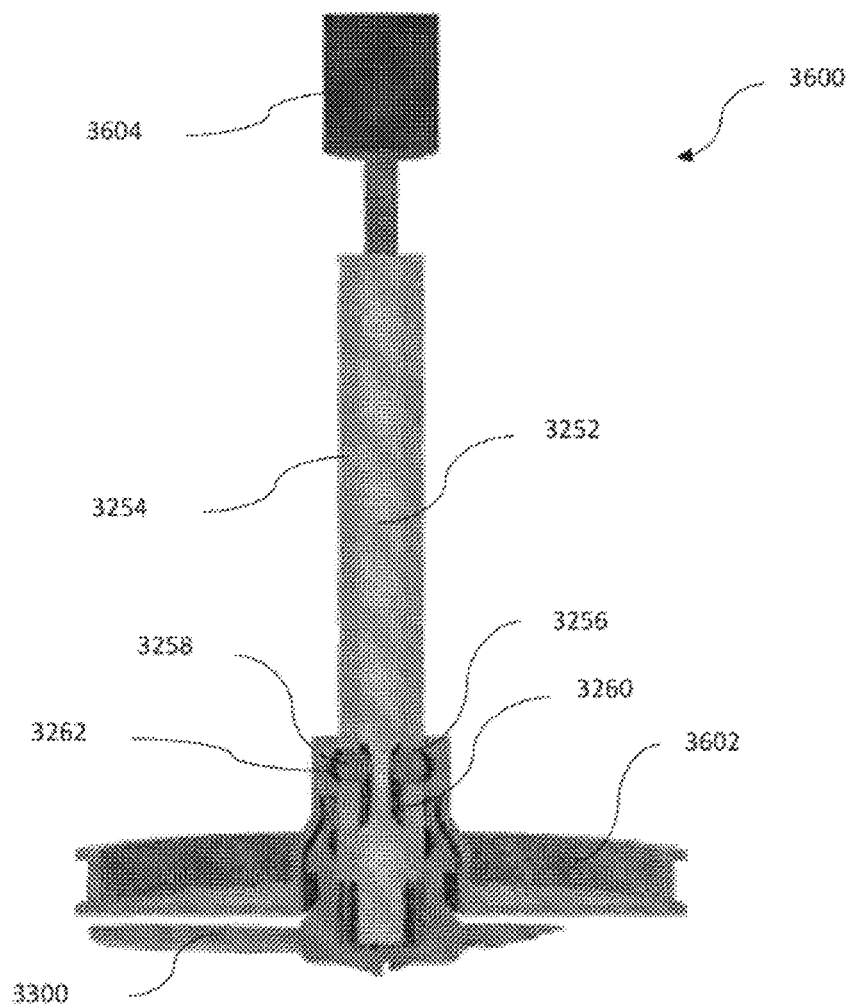
FIG. 9A illustrates another extrusion assembly, according to some embodiments of the disclosure.

FIG. 9A illustrates another extrusion assembly 3600 in which the plunger 3602 and the blade 3300 may be installed to the same lid, according to some embodiments of the disclosure. As shown in FIG. 9A, a plunger 3602, alone or in combination with other components (e.g., a lid, a bowl, and a nozzle, not shown), may constitute the extrusion assembly 3600 for extruding processed ingredients from the bowl. In some embodiments, the bowl may be the bowl 352, 352' or 852. The extrusion assembly 3600 may comprise an electromagnet, such as a solenoid 3604, operable with a piston configured to move an inner shaft 3252. The inner shaft 3252 may extend through an outer shaft 3254 such that the inner shaft 3252 and the outer shaft 3254 can translate independently of each other. The outer shaft 3254 may define opposing holes 3256 for passage of ball bearings 3258. An outer surface of the inner shaft 3252 may define opposing cavities 3260 for housing the ball bearings 3258. An inner surface of the plunger 3602 also may define opposing recesses 3262 for receiving the ball bearings 3258. The blade 3300 may be attachable to the outer shaft 3254, for example, by a bayonet coupling. However, the disclosure contemplates other suitable methods for coupling the blade 3300 to the outer shaft 3254.

Figure 9E:
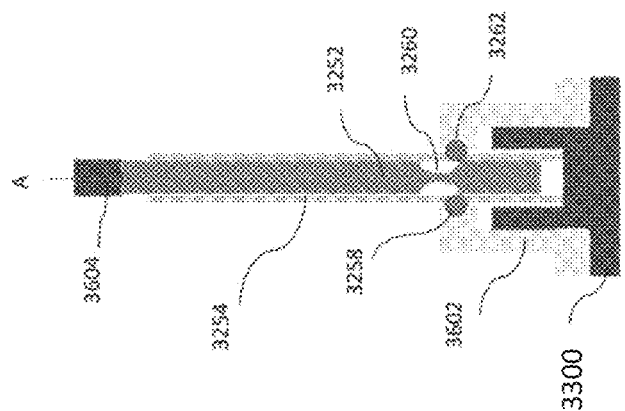
FIGS. 9B-9H illustrate the use of the extrusion assembly of FIG. 9A, according to some embodiments of the disclosure.
Figure 9D:
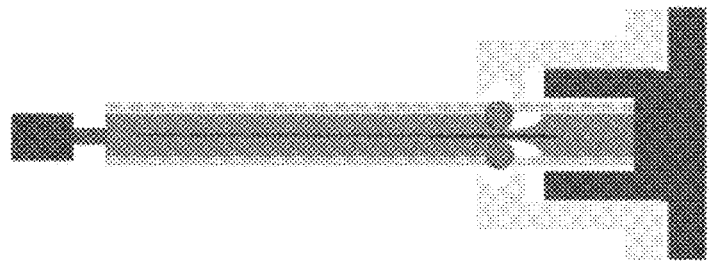
Figure 9C:
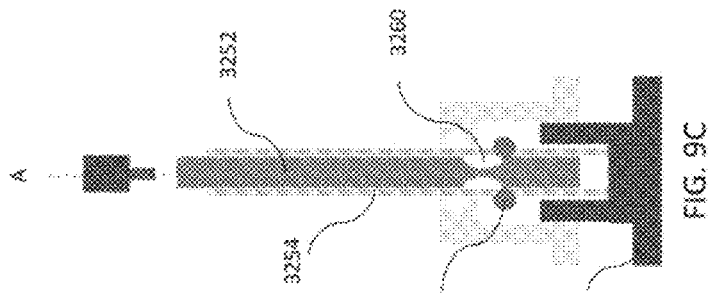
Figure 9B:
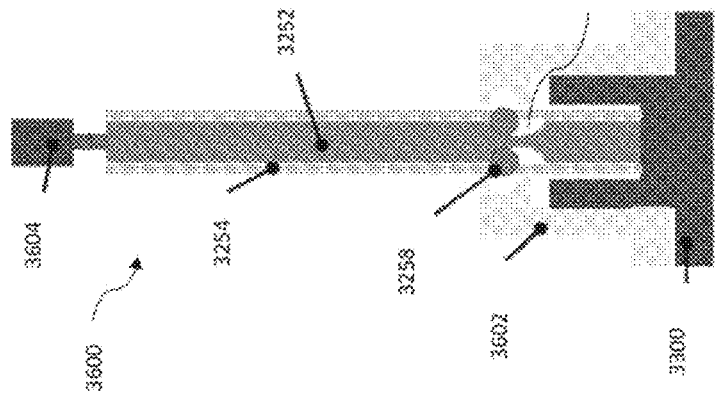
Figure 9H:
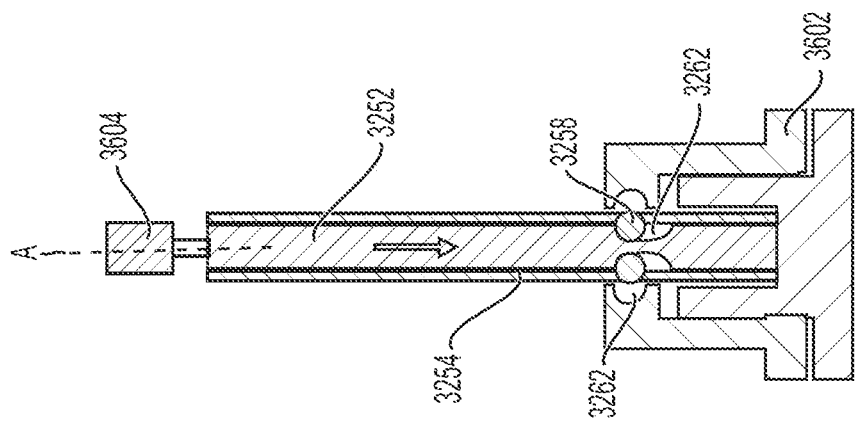
Figure 9G:
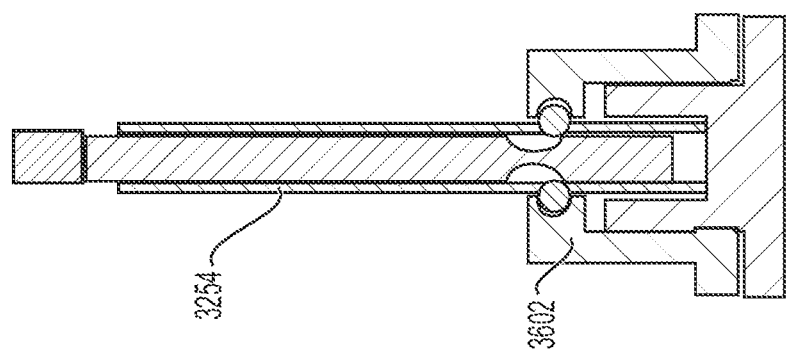
Figure 9F:
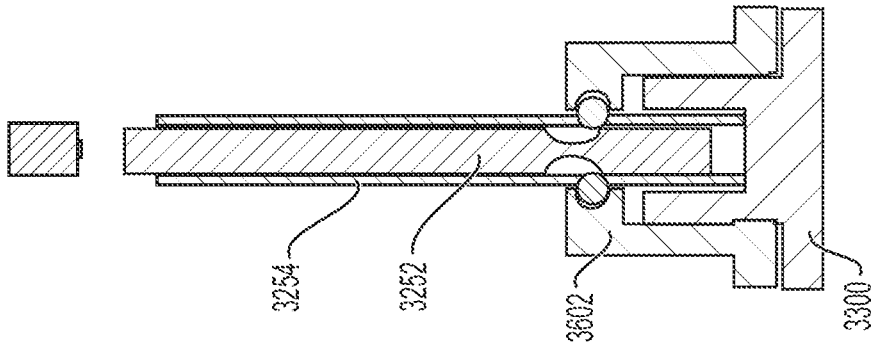

FIGS. 9B-9H schematically illustrate the use of the extrusion assembly 3600 according to some embodiments of the disclosure. As shown in FIG. 9B, the user may first install the plunger 3260 to the lid (not shown), for example, via a magnetic coupling. In this configuration, the plunger 3206 may not be attached to the outer shaft 3254 and the ball bearings 3258 may reside in an upper portion of the cavities 3260 of the inner shaft 3252. The user may then attach the blade 3300 to the outer shaft 3254. As shown in FIG. 9C, to begin the processing step, the outer shaft 3254, together with the ball bearings 3258, may translate relative to the inner shaft 3252 to descend the blade 3300 into the bowl and then rotate with the inner shaft 3252 to process the ingredients within the bowl. As the ball bearings 3258 travel along the inner surface of the cavities 3260 to the end of the lower portion of the cavities 3260, they may move away from the central axis A to protrude from the holes 3256 in the outer shaft 3254. As shown in FIG. 9D, once the processing step is complete, the components may return to the home position shown in FIG. 9B. As shown in FIG. 9E, to begin the extrusion step, the solenoid 3604 may retract, causing the inner shaft 3252 to move upwards relative to the outer shaft 3254. As the ball bearings 3258 reach the end of the lower portion of the cavity 3260, they may again move away from the central axis A to protrude from the holes 3256 in the outer shaft 3254 and thus engage the recesses 3262 in the plunger 3602. In this configuration, the plunger 3602 may be locked to the outer shaft 3254. As shown in FIG. 9F, both the inner shaft 3252 and the outer shaft 3254 may descend again with both the plunger 3602 and the blade 3300 attached to extrude the processed ingredients from the nozzle. As shown in FIG. 9G, once the extrusion step is complete, the components may return to the pre-extrusion position shown in FIG. 9E, with the plunger 3602 still attached to the outer shaft 3254. Finally, as shown in FIG. 9H, the solenoid 3604 may extend, causing the inner shaft 3252 to move downward to relative to the outer shaft 3254. As the ball bearings 3258 reach the upper portion of the cavity 3260, they may move toward the central axis A to disengage from the recesses 3262 in the plunger 3602. In this configuration, the plunger 3602 may be disconnected from the outer shaft 3254.

Figure 10A:
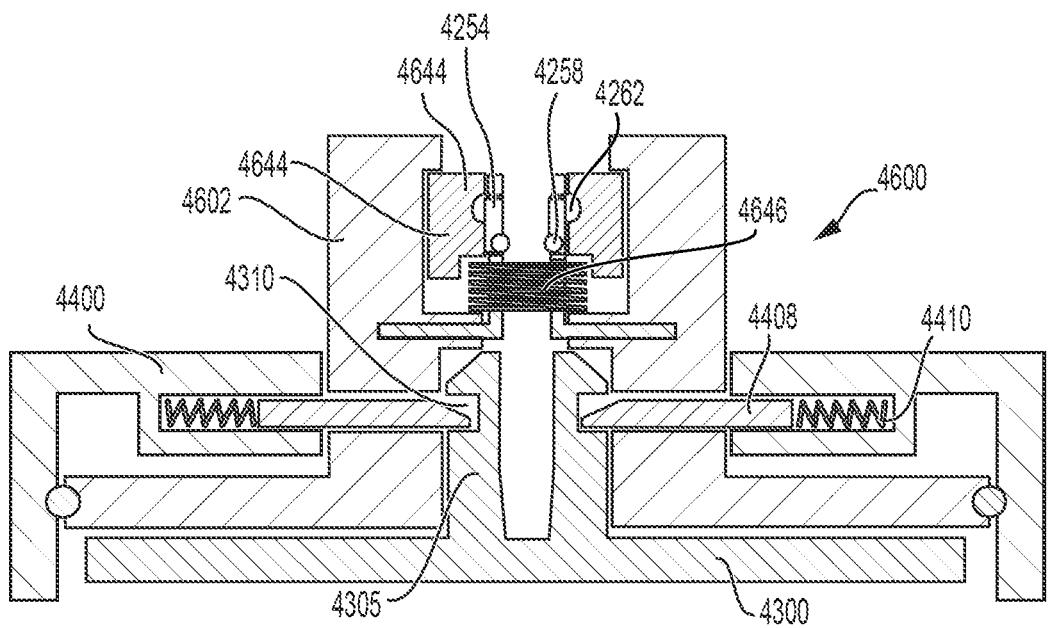
FIGS. 10A-10F illustrate the use of another extrusion assembly, according to some embodiments of the disclosure.
Figure 10B:
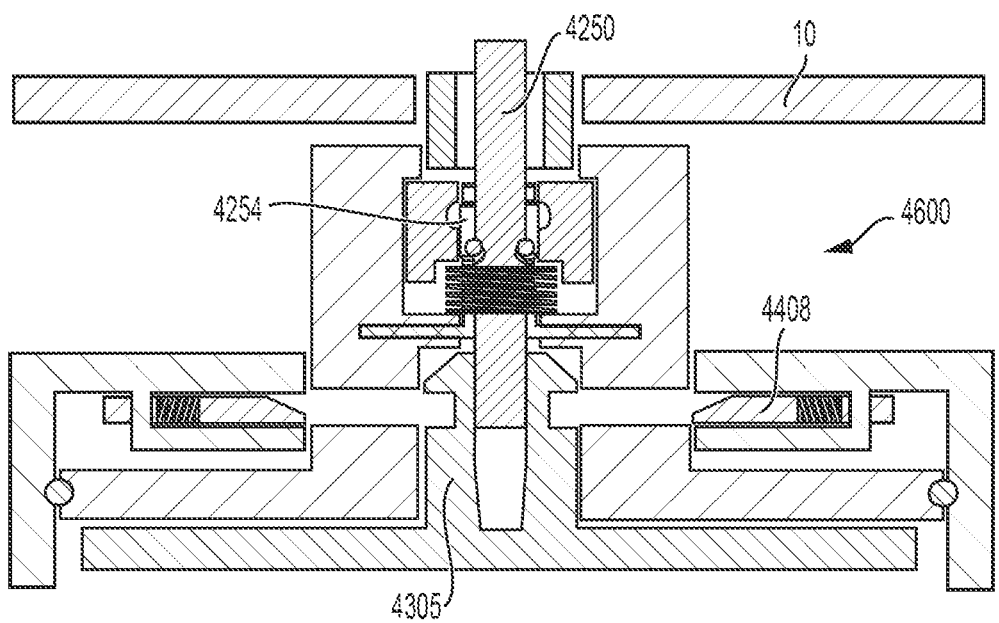
Figure 10C:
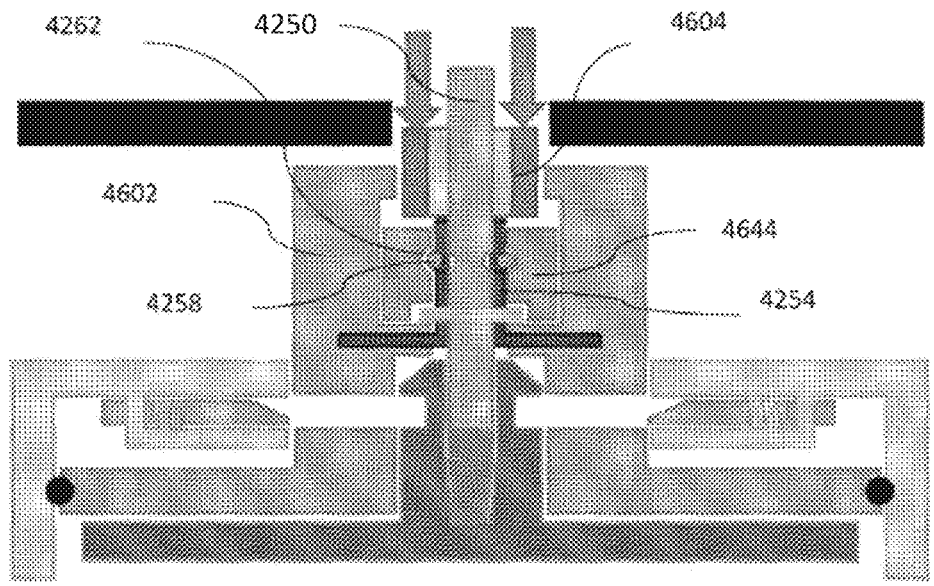
Figure 10D:
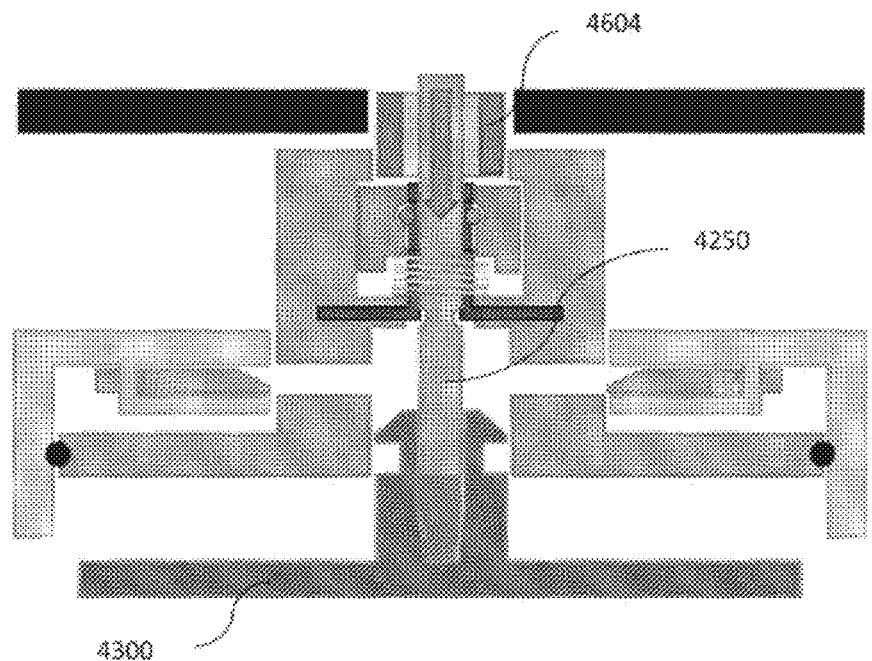
Figure 10E:
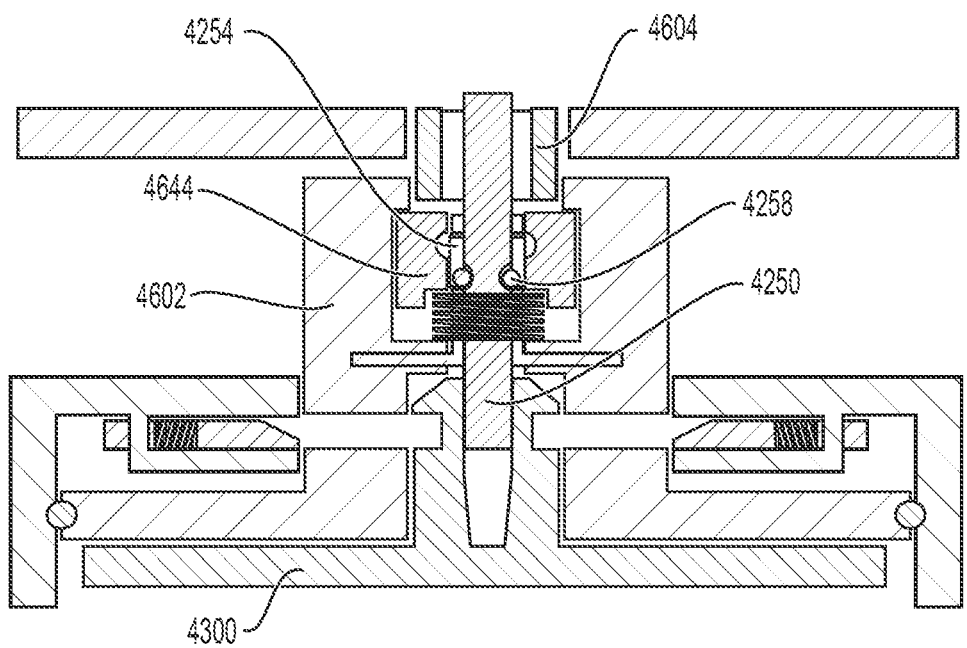
Figure 10F:
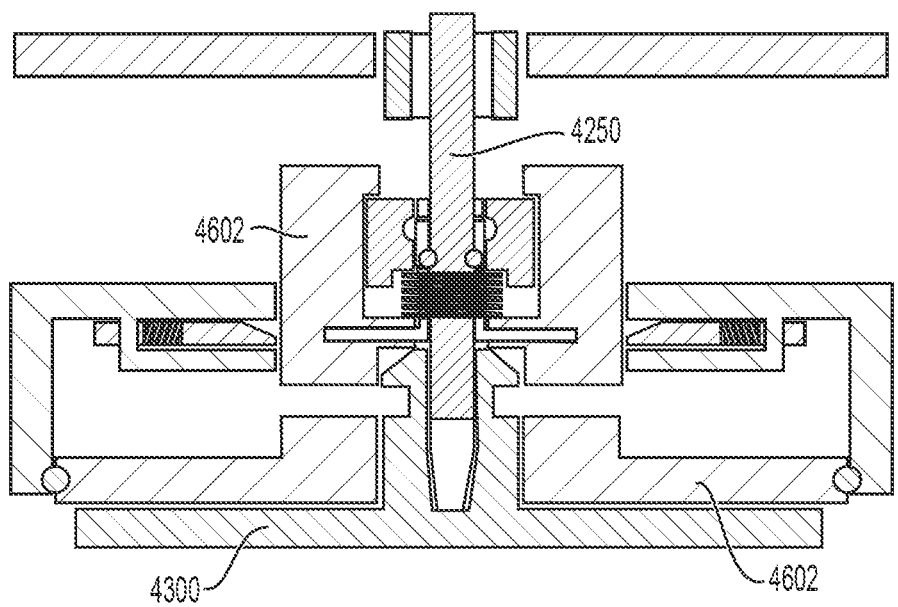

FIGS. 10A-10F schematically illustrate the use of another extrusion assembly 4600 according to some embodiments of the disclosure. As shown in FIG. 10A, a plunger 4602, alone or in combination with other components (e.g., a lid 4400, a bowl, and a nozzle), may constitute the extrusion assembly 4600 for extruding processed ingredients from the bowl. In some embodiments, the bowl may be the bowl 352, 352' or 852. As shown in FIG. 10A, the extrusion assembly 4600 may further comprise an outer shaft 4254 extending through the plunger 4602. An inner surface of the outer shaft 4254 may be configured to house ball bearings 4258. A moveable collar 4644 may be disposed about the outer shaft 4254 and may be biased upward, for example, by a first spring 4646. To begin the processing step, the user may first install the plunger 4602 to the lid 4400. The user may then attach the blade 4300 to the lid 4400 such that a pair of primary clips 4408 act under force of a second spring 4410 to engage a groove 4310 on the central support hub 4305. As shown in FIG. 10B, the user may then attach the lid 4400 to the bowl (not shown) and couple to the bowl to the micro-puree machine 10 such that the driven shaft 4250 extends through the outer shaft 4254 to engage the central support hub 4305. The micro-puree machine 10 may be configured such that coupling the bowl to the micro-puree machine 10, 800 causes the primary clips 4408 to disengage from the central support hub 4305 to allow the blade 4300 to move away from the lid 4400. As shown in FIG. 10C, to begin the processing step, an electromagnet, such a solenoid 4604, may press down on the collar 4644 to move the collar 4644 against the force of the spring 4646 such that ball bearings 4258 extend through openings in the outer shaft 4254 to engage recesses 4262 on an inner surface of the collar 4644. In this configuration, the plunger 4602 may be locked to the outer shaft 4254 such that the blade 4300 can move independently of the plunger 4602. As shown in FIG. 10D, the driven shaft 4250 and the blade 4300 may descend into the bowl and rotate to process ingredients within the bowl. As shown in FIG. 10E, after processing, the driven shaft 4250 and the blade 4300 may then return to the home position. To begin the extrusion step, the solenoid 4604 may no longer press down on the collar 4644, allowing the collar 4644 to move upward to release the ball bearings 4258 from engagement with the collar 4644 such that the plunger 4602 is no longer locked to the outer shaft 4254. Finally, as shown in FIG. 10F, the driven shaft 4250 may descend both the plunger 4602 and the blade 4300 into the bowl to extrude the processed ingredients from the bowl.

The disclosure contemplates that, in some embodiments (not shown), the bowl 352 can be coupled vertically in an inverted orientation (i.e., downward) on a top or upward-facing surface of the housing 120 whereby blade 300 moves up and then down to creamify, process, and/or mix ingredients in the bowl 352. The upward-facing surface may face vertically upward or be angled in an upward direction.

In some embodiments, micro-puree machine 10 may be configured to automatically detect a size of the bowl 352 and, in response to the detection, extend the blade 300 a depth and/or travel distance into the bowl 352 based on the detected size of the bowl 352. This bowl-size detection would advantageously enable the micro-puree machine 10 to process ingredients in different sized containers, such as a single serve container or larger containers.

While the disclosure particularly shows and describes preferred embodiments, those skilled in the art will understand that various changes in form and details may exist without departing from the spirit and scope of the present application as defined by the appended claims. The scope of this present application intends to cover such variations. As such, the foregoing description of embodiments of the present application does not intend to limit the full scope conveyed by the appended claims.

What is claimed is:

1. A micro-puree machine comprising:
   a housing;
   a bowl assembleable to the housing, the bowl including a sidewall defining an interior volume, the sidewall extending between a first end of the bowl and a second end opposite the first end;
   a first lid removably coupleable to the first end of the bowl, the first lid configured to house a blade that processes ingredients to produce processed ingredients;
   a nozzle in fluid communication with the bowl; and
   a plunger engageable with a driven shaft of the micro-puree machine, the driven shaft being held in the housing and being driven by a motor within the housing, the driven shaft configured to axially move the plunger within the interior volume of the bowl to force the processed ingredients within the interior volume to be extruded from the nozzle,
   wherein the driven shaft is further engageable with the blade for processing the ingredients in the bowl, and
   wherein the driven shaft is configured to axially move the blade within the interior volume of the bowl.

2. The micro-puree machine of claim 1, wherein the first lid is configured to house the plunger.

3. The micro-puree machine of claim 1, further comprising a second lid removably couplable to the first end of the bowl, wherein the plunger is couplable to the second lid prior to moving axially within the interior volume.

4. The micro-puree machine of claim 1, wherein the bowl has an end wall, and wherein the nozzle is configured for fluid communication with the bowl through a passage defined by an opening in the end wall.

5. The micro-puree machine of claim 1, wherein the driven shaft is operatively connected to the micro-puree machine.

6. The micro-puree machine of claim 1, wherein:
   the bowl is engageable to the micro-puree machine between a first configuration, in which the bowl is configured for processing of ingredients within the interior volume, and a second configuration, in which the bowl is configured for extrusion of the processed ingredients from the interior volume; and
   the bowl is reversible along its major axis between the first and second configurations.

7. The micro-puree machine of claim 6, further comprising a second lid removably couplable to the second end of the bowl, wherein the plunger is couplable to the second lid prior to moving axially within the interior volume.

8. An extrusion assembly for extruding processed ingredients from a micro-puree machine, the extrusion assembly comprising:
   a bowl including a sidewall defining an interior volume, the sidewall extending between a first end of the bowl and a second end opposite the first end;
   a first lid removably coupleable to the first end of the bowl, the first lid configured to house a blade that processes ingredients to produce processed ingredients;
   a nozzle in fluid communication with the bowl; and
   a plunger configured to be engageable with a driven shaft of the micro-puree machine, the driven shaft being held in the micro-puree machine and being puree machine, the plunger being configured to axially move within the interior volume of the bowl by the driven shaft to force the processed ingredients within the interior volume to be extruded from the nozzle,
   wherein the blade is engageable with the driven shaft for processing the ingredients in the bowl, and
   wherein the driven shaft is configured to axially move the blade within the interior volume of the bowl.

9. The extrusion assembly of claim 8, wherein the first lid is configured to house the plunger.

10. The extrusion assembly of claim 8, further comprising a second lid removably couplable to the first end of the bowl, wherein the plunger is couplable to the second lid prior to moving axially within the interior volume.

11. The extrusion assembly of claim 8, wherein the bowl has an end wall, and wherein the nozzle is configured for fluid communication with the bowl through a passage defined by an opening in the end wall.

12. The extrusion assembly of claim 8, wherein:
   the bowl is configured to be engageable to the micro-puree machine between a first configuration, in which the bowl is configured for processing of ingredients within the interior volume, and a second configuration, in which the bowl is configured for extrusion of the processed ingredients from the interior volume; and the bowl is reversible along its major axis between the first and second configurations.

13. The extrusion assembly of claim 12, further comprising a second lid removably couplable to the second end of the bowl, wherein the plunger is couplable to the second lid prior to moving axially within the interior volume.

14. A method of extruding processed ingredients from a micro-puree machine including an extrusion assembly having a bowl including a sidewall defining an interior volume, the sidewall extending between a first end of the bowl and second end opposite the first end, a first lid removably coupleable to the first end of the bowl, the first lid configured to house a blade that processes ingredients to produce processed ingredients, a nozzle in fluid communication with the bowl, and a plunger configured to be engageable with a driven shaft of the micro-puree machine, the driven shaft being held in the micro-puree machine and being driven by the micro-puree machine, the driven shaft configured to axially move the plunger within the interior volume of the bowl, the method comprising:

engaging the blade with the driven shaft;

using the blade, processing ingredients within the interior volume of the bowl including axially moving the blade;

disengaging the blade from the driven shaft;

engaging the plunger with the driven shaft; and moving the plunger through the interior volume of the bowl to extrude the processed ingredients from the nozzle.

15. The method of claim 14, further comprising:

after disengaging the blade from the driven shaft and before engaging the plunger with the driven shaft, removing the first lid and attaching a second lid housing the plunger to the first end of the bowl.

* * * * *

UNITED STATES PATENT AND TRADEMARK OFFICE
CERTIFICATE OF CORRECTION

PATENT NO. : 12,478,217 B2  
APPLICATION NO. : 18/595116  
DATED : November 25, 2025  
INVENTOR(S) : Noah William Weinstock et al.

Page 1 of 1

It is certified that error appears in the above-identified patent and that said Letters Patent is hereby corrected as shown below:

In the Claims

Column 18, Line 44, Claim 8, delete "being puree" and insert -- driven by the micro-puree --

Signed and Sealed this  
Twenty-seventh Day of January, 2026

John A. Squires  
*Director of the United States Patent and Trademark Office*